United States Patent
Mimura et al.

(10) Patent No.: US 6,318,866 B1
(45) Date of Patent: Nov. 20, 2001

(54) TRIANGULAR-PYRAMIDAL CUBE-CORNER RETRO-REFLECTIVE SHEETING

(75) Inventors: Ikuo Mimura, Uozu; Yutaka Hamada, Namerikawa; Takehito Takahashi, Kokubunzi-machi, all of (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,191

(22) Filed: Apr. 13, 2000

(30) Foreign Application Priority Data

Mar. 15, 2000 (JP) ................................................ 12-072279

(51) Int. Cl.[7] .................................................. G02B 5/124
(52) U.S. Cl. .......................................... 359/530; 359/529
(58) Field of Search ................................ 359/529, 530; 428/167

(56) References Cited

U.S. PATENT DOCUMENTS

| | | | |
|---|---|---|---|
| Re. 29,396 | 9/1977 | Heenan | 204/281 |
| 2,310,790 | 2/1943 | Jungersen. | |
| 2,380,447 | 7/1945 | Jungersen. | |
| 2,481,757 | 9/1949 | Jungersen. | |
| 3,712,706 | 1/1973 | Stamm. | |
| 4,025,159 | 5/1977 | McGrath. | |
| 4,349,598 | 9/1982 | White | 428/161 |
| 4,588,258 | 5/1986 | Hoopman | 350/103 |
| 4,897,136 | 1/1990 | Bailey et al. | 156/145 |
| 5,064,272 | 11/1991 | Bailey et al. | 359/541 |
| 5,138,488 | 8/1992 | Szczech | 359/529 |
| 5,557,836 | 9/1996 | Smith et al. | 29/527.4 |
| 5,564,870 | 10/1996 | Benson et al. | 409/131 |
| 5,600,484 | 2/1997 | Benson et al. | 359/529 |
| 5,696,627 | * 12/1997 | Benson et al. | 359/529 |
| 5,721,640 | 2/1998 | Smith et al. | 359/530 |

FOREIGN PATENT DOCUMENTS

| | | |
|---|---|---|
| 0 137 736 | 4/1985 | (EP). |
| 0 175 031 | 3/1986 | (EP). |
| 0 548 280 | 6/1993 | (EP). |
| 441319 | 12/1933 | (GB). |
| 63-143502 | 6/1988 | (JP). |
| 92/04647 | 3/1992 | (WO). |
| WO 94/14091 | 6/1994 | (WO). |
| WO 95/11463 | 4/1995 | (WO). |
| WO 95/11465 | 4/1995 | (WO). |
| WO 95/11470 | 4/1995 | (WO). |

* cited by examiner

Primary Examiner—James Phan
(74) Attorney, Agent, or Firm—Fitzpatrick, Cella, Harper & Scinto

(57) ABSTRACT

The triangular-pyramidal cube-corner retroreflective sheeting is constituted so that a pair of triangular-pyramidal cube-corner retroreflective elements partitioned by three lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other are arranged in a closest-packed state so as to protrude to one side on a common bottom plane (S–S'), opposite faces (faces $c_1$ and $c_2$) of this pair of triangular-pyramidal retroreflective elements share a base (x), the bottom plane (S–S') is a common plane including bases (z and z) of one-side lateral faces (faces $a_1$ and $a_2$) and bases (y and y) of the other-side lateral faces (faces $b_1$ and $b_2$) of this pair of triangular-pyramidal retroreflective elements, this pair of triangular-pyramidal retroreflective elements have faced lateral faces (faces $c_1$ and $c_2$) having shapes different from each other, and heights from the bottom plane (S–S') up to apexes of the elements are different from each other.

14 Claims, 17 Drawing Sheets

TRIANGULAR-PYRAMIDAL CUBE-CORNER RETRO-REFLECTIVE SHEETING

BACKGROUND OF THE INVENTION

1. Field of the Invention

The present invention relates to a triangular-pyramidal cube-corner retroreflective sheeting having a novel structure. More minutely, the present invention relates to a cube-corner retroreflective sheeting in which triangular-pyramidal reflective elements having a novel structure are arranged in a closest-packed state.

More minutely, the present invention relates to a cube-corner retroreflective sheeting constituted of triangular-pyramidal cube-corner retroreflective elements (hereafter referred to as triangular-pyramidal reflective elements or merely, elements) useful for signs including license plates of automobiles and motorcycles, safety materials of clothing and life jackets, markings of signboards, and reflectors of visible-light, laser-beam, and infrared-ray reflective sensors.

Still more minutely, the present invention relates to triangular-pyramidal cube-corner retroreflective sheeting in which a pair of triangular-pyramidal cube-corner retroreflective elements partitioned by three lateral faces (faces $a_1$, $b_1$, and $c_1$; faces $a_2$, $b_2$, and $C_2$; . . . ) almost perpendicularly intersecting each other because V-shaped grooves having substantially-symmetric cross sections intersect each other are arranged in a closest-packed state so as to protrude to one side on a common bottom plane (S–S'), faced lateral faces (faces $c_1$ and $c_2$) of this pair of triangular-pyramidal retroreflective elements are paired by sharing a base (x), the bottom face (S–S') is a common plane including bases (z and z) of one-side lateral faces (faces $a_1$ and $a_2$) and bases (y and y) of the other-side lateral faces (faces $b_1$ and $b_2$), and faced lateral faces (faces $c_1$ and $c_2$) of the triangular-pyramidal retroreflective elements sharing the base (x) have shapes different from each other, and heights from the bottom face (S–S') up to the apex are different from each other.

Still more minutely, the present invention relates to a triangular-pyramidal cube-corner retroreflective sheeting in which a pair of triangular-pyramidal cube-corner retroreflective elements partitioned by three lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other have substantially optically analogous shapes and thereby, have angles θ (hereafter also referred to as tilts of optical axes) formed between substantially same optical axes though different from each other in direction by 180° and a vertical line.

2. Description of the Related Art

A retroreflective sheeting for reflecting entrance light toward a light source has been well known so far and the sheeting using its retroreflective characteristic is widely used in the above fields. Particularly, a cube-corner retroreflective sheeting using the retroreflective theory of a cube-corner retroreflective element such as a triangular-pyramidal retroreflective element is extremely superior to a conventional retroreflective sheeting using micro glass beads in retroreflectivity and its purpose has been expanded year by year because of its superior retroreflective performance.

However, though a conventionally-publicly-known triangular-pyramidal retroreflective element shows a preferable retroreflectivity when an angle formed between an axis vertical to a sheet plane (axis passing through the apex of the triangular pyramid of the triangular-pyramidal retroreflective element equally separate from three faces constituting a triangular-pyramidal cube-corner retroreflective element and intersecting each other at an angle of 90°) and entrance light (the angle is hereafter referred to as entrance angle) is kept in a small range. However, the retroreflectivity rapidly deteriorates as the entrance angle increases (that is, the entrance angularity deteriorates).

Moreover, the light entering the triangular-pyramidal retroreflective element face at an angle less than a critical angle ($α_c$) satisfying an internal total-reflection condition determined by the ratio between the refractive index of a transparent medium constituting the triangular-pyramidal retroreflective element and the refractive index of air penetrates into the back of the element without totally reflecting on the interface of the element. Therefore, a retroreflective sheeting using a triangular-pyramidal retroreflective element generally has a disadvantage that it is inferior in entrance angularity.

However, because a triangular-pyramidal retroreflective element can reflect light in the light entrance direction almost over the entire surface of the element, retroreflected light is not diverged at a wide angle due to spherical aberration differently from the case of a micro-glass-bead reflective element.

However, the narrow dispersion angle of the retroreflected light practically easily causes a trouble that, when the light emitted from a head lamp of an automobile is retroreflected on a traffic sign, the retroreflected light hardly reaches, for example, a driver present at a position distant from the axis of the incident light. Particularly when the distance between an automobile and a traffic signal decreases, the above trouble more frequently occurs because the angle (observation angle) formed between the entrance axis of a light ray and the axis (observation axis) connecting a driver and a reflective point increases (that is, the observation angularity deteriorates).

For the above cube-corner retroreflective sheeting, particularly for the entrance angularity or observation angularity of a triangular-pyramidal cube-corner retroreflective sheeting, many proposals have been known so far and various improvements and studies are performed.

For example, Jungersen's U.S. Pat. No. 2,481,757 discloses a retroreflective sheeting constituted by arranging retroreflective elements of various shapes on a thin sheeting and a method for manufacturing the sheeting. Moreover it is described that triangular-pyramidal reflective elements disclosed in the above U.S. patent include a triangular-pyramidal reflective element in which the apex is located at the center of a base triangle and the optical axis does not tilt and a tilted triangular-pyramidal reflective element in which the apex is not located at the center of a base triangle to efficiently reflect light toward an approaching automobile.

Furthermore, it is described that the size of a triangular-pyramidal reflective element, that is, the depth of the element is 1/10 in (2,540 μm) or less. Furthermore, FIG. 15 in the U.S. patent illustrates a triangular-pyramidal reflective element whose optical axis tilts in the direction to be plus (+) as described later. The tilt angle (θ) of the optical axis is estimated as approx. 6.5° when obtaining it from the ratio between the major and minor sides of the base triangle of the illustrated triangular-pyramidal reflective element.

Moreover, the above Jungersen's U.S. patent does not specifically disclose a very small triangular-pyramidal reflective element shown in FIG. the present invention or it does not disclose a size or an optical axis tilt a triangular-pyramidal reflective element must have in order to show superior observation angularity and entrance angularity.

Furthermore, Stamm's U.S. Pat. No. 3,712,706 discloses a retroreflective sheeting in which so-called equilateral triangular-pyramidal cube-corner retroreflective elements whose base triangles are equilateral triangles are arranged on a thin sheeting so that their bottom faces are brought into a closest-packed state on a common plane. Stamm's U.S. patent solves the problems that retroreflectivity is deteriorated and light entrance at an angle of less than an internal total reflection condition passes through an interface between elements and thereby it is not retroreflected by vacuum-depositing with a metal such as aluminum on the reflective surface of a reflective element, mirror-reflecting entrance light, and increasing an entrance angle.

However, because a mirror layer is set on a reflection-side face as means for improving wide angularity in the above Stamm's proposal, a problem easily occurs that the appearance of an obtained retroreflective sheeting becomes dark or a metal such as aluminum or silver used for the mirror layer is oxidized due to penetration of water or air and thereby, reflectivity frequently lowers. Moreover, means for improving wide angularity in accordance with a tilt of an optical axis is not described at all.

Moreover, Hoopman's European Pat. No. 137,736B1 describes a retroreflective sheeting in which a pair of tilted triangular-pyramidal cube-corner retroreflective elements whose base triangles are isosceles triangles are arranged on a thin sheeting while rotated by 180° from each other and whose bottom faces are arranged on a common plane in a closest-packed state. Optical axes of the triangular-pyramidal cube-corner retroreflective elements described in the above patent tilt in the minus (−) direction described in this specification and it is shown that the tilt angle ranges between 70 and 13°.

Furthermore, also Szczech's U.S. Pat. No. 5,138,488 discloses a retroreflective sheeting in which tilted triangular-pyramidal cube-corner retroreflective elements each of whose bottom face is an isosceles triangle are arranged on a thin sheeting so that their bottom faces are brought into a closest-packed state on a common plane. In this U.S. patent, optical axes of the triangular-pyramidal reflective elements tilt in the direction of a side shared by two triangular-pyramidal reflective elements paired by facing each other, that is, the plus (+) and minus (−) directions to be mentioned later and the tilt angle is approx. 2° to 5° and it is specified that the size of each element ranges between 25 $\mu$m and 100 $\mu$m.

Moreover, in the case of European Pat. No. 548,280B 1 corresponding to the above patent, it is described that an optical axis tilts so that the distance (p) between a face including a common side of paired elements and vertical to a common plane and the apex of an element is not equal to the distance (q) between a point at which the optical axis of an element intersects with the common plane and the vertical face and a tilt angle of the optical axis ranges between approx. 2° and 5°, and the height from the common plane up to the apex of an element ranges between 25 and 100 $\mu$m.

As described above, in the case of Szczech's European Pat. No. 548,280B1, the tilt of an optical axis ranges between +2° and +5° (both included) and between −2° and −5° (both included). In the case of embodiments of the above Szczech's U.S. and European patents, however, only triangular-pyramidal retroreflective elements are disclosed which have optical-axis tilt angles of −8.2°, −9.2°, and −4.3° and an element height (h) of 87.5 $\mu$m.

The above-described conventionally publicly-known triangular-pyramidal cube-corner retroreflective elements of Jungersen's U.S. Pat. No. 2,481,757, Stamm's U.S. Pat. No. 3,712,706, Hoopman's European Pat. No. 137,736B1, Szczech's U.S. Pat. No. 5,138,488, and European Pat. No. 548,280B1 are common in that the bottom faces of a plurality of triangular-pyramidal reflective elements serving as cores of entrance and reflection of light are present on the same face, a pair of elements faced each other respectively have analogous shapes, and heights of elements are equal to each other. Every retroreflective sheeting constituted of a triangular-pyramidal retroreflective element whose bottom face is present on the same face is inferior in entrance angularity, that is, every retroreflective sheeting has a disadvantage that retroreflective brightness rapidly decreases when the entrance angle of light to the triangular-pyramidal retroreflective elements increases.

As an attempt for improving the observation angularity, the official gazette of Japanese Patent Laid-Open No. 143502/1988 by Appeldorn et al. discloses an attempt that to make a triangular-pyramidal cube-corner prism die by cutting the surface of a flat plate with a diamond cutter or the like from three directions and forming V-shaped grooves intersecting at one point, a plurality of triangular-pyramidal retroreflective element groups are formed by slightly tilting symmetric faces of V-shaped grooves from the direction vertical to the flat plate and slightly deviating a cutting angle from a normal value, and cutting the V-shaped grooves, and a slight divergence is provided for reflected light of a cube-corner retroreflective sheeting formed by the die according to the element groups. The pair of reflective elements thus obtained have substantially analogous shapes and the elements substantially having the same height share a base and form a shape in which the elements rotate by 180° from each other.

A retroreflective sheeting obtained through the method proposed by Appeldorn et al. can be a sheeting whose entrance angularity and observation angularity are improved to a certain extent. However, very complex operations are required together with a very-high accuracy and skill.

Moreover, a retroreflective element assembly is also publicly known which includes an asymmetric retroreflective element pair in which three-directional V-shaped grooves do not intersect at one point.

For example, the official gazette of International Patent Publication No. 94/14,091 (WO94/14091) by Gubela discloses a unique retroreflective body and its forming method in order to providing wide angularity for retroreflected light by decreasing the non-retroreflective surface of the retroreflective body. The retroreflective body is constituted by setting a hexagonal pyramid whose bottom face is an equilateral hexagon ($A_0$-$D_1$-$E_1$-$B_0$-$E_2$-$D_2$) to the central portion of the bottom face of a rhombus formed when two-directional V-shaped grooves shown in FIGS. 5 and 6 intersect each other at an angle of 60° and symmetrically arranging two equilateral triangular pyramids whose bases are equilateral triangles ($D_1$-$C_1$-$H_1$ and $D_2$-$C_2$-$E_2$) and whose heights are equal to each other. Among six lateral faces of the central hexagonal pyramid, three lateral faces (faces $d_1$, $d_2$, and $d_3$ and faces $e_1$, $e_2$, and $e_3$) every other one form two sets of retroreflective-prism lateral faces perpendicularly intersecting on each extended face.

Therefore, in the case of the retroreflective body described in the official gazette of Gubela, another-directional V-shaped grooves ($D_1$-$E_1$ and $D_2$-$E_2$) do not pass through the apex of a rhombus ($A_0$-$C_1$-$B_0$-$C_2$) formed by four V-shaped grooves ($A_0$-$C_1$, $B_0$-$C_2$, and $A_0$-$C_2$, $B_0$-$C_1$) and an offset value from the apex ($H_0$) of the another-directional V-shaped grooves is equal to 25% of the length of the longer diagonal line of the rhombus (that is, in FIGS. 5 and 6, intervals between $C_1$-$C_1$, $E_1$-$E_1$, $B_0$-$H_0$, $E_2$-$E_2$, and $C_2$-$C_2$) shown by dotted extension lines are equal to each other and are ¼ the interval between $C_1$-$C_1$ and $C_2$-$C_2$). Thereby, a pair of equilateral triangular pyramids which have the same height and which are symmetric and one hexagonal pyramid whose bottom face is an equilateral triangle ($A_0$-$D_1$-$E_1$-$B_0$-$E_2$-$D_2$) are formed in the rhombus. Moreover, no description or suggestion about a retroreflective-element assembly specified by the present invention is present in the official gazette.

Moreover, for the light incoming from the bottom-face direction of the Gubela's hexagonal pyramid to retroreflect, it is necessary that the light reflected from a first entrance face repeats reflection only on the above faces every other one. If a second or third reflective face is a face other than the above faces, the light does not retroreflect but it passes through the face or diverges. Therefore, a certain effect is expected on improvement of observation angularity due to spread of reflected light. However, improvement of entrance angularity is not expected at all but entrance angularity is rather forced to deteriorate.

Moreover, the official gazette of International Patent Publication No. WO95/11,470 (Specification of U.S. Pat. No. 5,600,484), official gazette of International Patent Publication No. WO95/11,463 (Specification of U.S. Pat. No. 5,721,640), and official gazette of International Patent Publication No. WO95/11,465 (Specifications of U.S. Pat. Nos. 5,557,836 and 5,564,870) disclose a retroreflective body constituted of a retroreflective-element assembly enclosed by asymmetric V-shaped grooves whose one-side wall has an angle almost vertical to or close to a base bottom face and its manufacturing method inn order to improve retroreflectivity and wide angularity.

As disclosed in the above official gazettes of International Publications, the retroreflective body by Benson et al. is cut so that another-directional tilted V-shaped groove does not pass through the intersection between rhombic base shapes formed by two-directional tilted V-shaped grooves and can be constituted of various reflective elements including elements having no retroreflectivity by changing the intersection angle, depth, V-shaped-groove angle, number of grooves, and degree of V-shaped-groove tilt of the two-directional V-shaped grooves and the offset position, number of grooves, depth, V-groove angle, and degree of V-shaped-groove tilt of the another-directional V-shaped groove.

Moreover, it is shown that because the retroreflective body by Benson et al. is an asymmetric V-shaped groove in which a V-shaped groove lateral face is tilted almost vertically to the base bottom face, a midway shape whose base is rhombic formed by two-directional V-shaped grooves passes through the shape asymmetric to right and left shown in FIG. 2 and reflective lateral faces formed of the midway shape include the faces $a_2$ and $b_2$ in FIG. 2. Moreover, a midway shape according to the prior art is formed of symmetric V-shaped grooves as shown in FIG. 1, reflective lateral faces to be formed are a pair of faces (faces $a_1$ and $b_1$ and faces $a_2$ and $b_2$).

In the case of the assembly of these reflective elements, optical axes of reflective elements faced each other at the both sides of a V-shaped groove are oriented toward the same direction because of the shape of the assembly. For example, even in the case of reflective elements whose optical axes tilt, the optical axes tilt in the same direction. Therefore, a slight improvement of observation angularity is expected in accordance with spread of reflected light due to variety of types of reflective elements. From the viewpoint of entrance angularity, the reflective-element assembly has a very high directivity and thereby, superior entrance angularity is expected in an optical-axes, tilting direction. However, the assembly is unavoidably inferior in entrance angularity in other directions.

Problems to Be Solved by the Invention

In general, the following are requested for a triangular-pyramidal cube-corner retroreflective sheeting as basic optical characteristics: high-brightness characteristics such as height (magnitude) of reflection brightness represented by reflection brightness of light incoming from the front of the sheeting and wide angularity. Moreover. three performances such as observation angularity, entrance angularity, and rotation angularity are requested for wide angularity.

As described above, any retroreflective sheeting constituted of conventionally-publicly-known triangular-pyramidal cube-corner retroreflective elements has a low entrance angularity and does not have observation angularity to be satisfied. However, the present inventor et al. unexpectedly find that it is possible to improve the entrance angularity of a retroreflective sheeting constituted of a triangular-pyramidal reflective element in which V-shaped grooves having substantially-symmetric cross sections intersect each other and thereby, a pair of triangular-pyramidal cube-corner retroreflective elements partitioned by three lateral faces (faces $a_1$, $b_1$, and $c_1$; faces $a_2$, $b_2$, and $c_2$; ... ) are arranged so as to protrude to one side on a common bottom face (S–S') in a closest-packed state, faced lateral faces (faces $c_1$ and $c_2$) of this pair of triangular-pyramidal retroreflective elements share a base (x) and are paired, the bottom face (S–S') is a common plane including the base (z and z) of one-side lateral faces (faces $a_1$ and $a_2$) and bases (y and y) of the other-side lateral faces (faces, $b_1$ and $b_2$), this pair of triangular-pyramidal retroreflective elements have faced lateral faces (faces $c_1$ and $c_2$) different from each other in shape, and heights from the base bottom face (S–S') up to apexes are different from each other.

SUMMARY OF THE INVENTION

Means for Solving the Problems

Before describing the present invention, a conventionally publicly-known art is described below.

FIGS. 7 and 8 show a top view and a sectional view for explaining triangular-pyramidal cube-corner retroreflective elements according to a prior art in order to compare the conventional retroreflective elements with triangular-pyramidal cube-corner retroreflective elements of the present invention.

In FIG. 7, triangular-pyramidal cube-corner retroreflective element groups protruding on a common plane share bases (x,x, ... ) and bottom faces of retroreflective elements are arranged on a common bottom plane (S–S') in a closest-packed state as element pairs faced each other so that the elements are almost symmetric to a plane (Lx–Lx') vertical to the common bottom face (S–S') including the bases (x,x, ... ) shared by the elements and heights of the elements are equal to each other.

Moreover, FIG. 8 shows a pair of reflective elements of the triangular-pyramidal reflective element groups shown in FIG. 7. Optical axes ($H_1$–$Q_1$ and $H_2$–$Q_2$) of this pair of triangular-pyramidal reflective elements tilt from the vertical plane (Lx–Lx') in directions opposite to each other so that differences between distances ($p_1$ and $p_2$) from intersections ($P_1$ and $P_2$) of vertical lines extended from apexes ($H_1$ and $H_2$) of this pair of elements to a bottom face (S–S') and the base (S–S') up to bases (x,x, ... ) shared by this pair of elements and distances ($q_1$ and $q_2$) from intersections ($Q_1$ and $Q_2$) of the optical axes and the bottom face up to the bases (x,x, ...) shared by this pair of elements become plus (+). These elements are faced each other as optically analogous shapes rotated by 180° from each other by sharing a base (x) and heights ($h_1$ and $h_2$) of two triangular-pyramidal reflective elements are equal to each other.

The present invention is more minutely described below by properly referring to the accompanying drawings.

FIGS. 9 and 10 show a top view and a sectional view for explaining a mode of a triangular-pyramidal cube-corner retroreflective element according to the present invention.

FIG. 9 shows a triangular-pyramidal cube-corner retroreflective element of the present invention in which a pair of triangular-pyramidal cube-corner retroreflective elements partitioned by three lateral faces (faces $a_1$, $b_1$, and $c_1$; faces $a_2$, $b_2$, and $c_2$; ...) almost perpendicularly intersecting each other because V-shaped grooves having substantially-symmetric cross sections intersect each other are arranged in a closest-packed state so as to protrude to one side on a common bottom face (S–S'), faced lateral faces (faces $c_1$ and $c_2$) of this pair of triangular-pyramidal retroreflective elements share a base (x) and are paired, the bottom face (S–S') is a common plane including bases (z and z) of one-side lateral faces (faces $a_1$ and $a_2$) of this pair of triangular-pyramidal retroreflective elements and bases (y and y) of the other-side lateral faces (faces $b_1$ and $b_2$) of the retroreflective elements, this pair of triangular-pyramidal retroreflective elements have faced lateral faces (faces $c_1$ and $c_2$) different from each other in shape, and heights ($hx_1$ and $hx_2$) from the base (S–S') up to apexes are different from each other.

FIG. 10 shows a triangular-pyramidal cube-corner retroreflective sheeting in which, when assuming that the height from a bottom face (Sx–Sx') including bases (x,x, ...) shared by faced lateral faces (faces $c_1$ and $c_2$) of a pair of triangular-pyramidal retroreflective elements ($R_1$ and $R_2$) up to a apex ($H_1$) of the triangular-pyramidal retroreflective element is $hx_1$ and the height from a common bottom face (S–S') including bases (z and z) of one-side lateral faces (faces $a_1$ and $a_2$) of the two triangular-pyramidal retroreflective elements and bases (y and y) of the other-side lateral faces (faces $b_1$ and $b_2$) of the elements up to the apex ($H_1$) is $hyz_1$, $hx_1$ is larger than $hyz_1$ and the height $hx_1$ from the bottom face (Sx–Sx') up to the apex ($H_1$) is larger than a height $hx_2$ from the bottom face (Sx–Sx') up to a apex ($H_2$). In this case, a V-shaped groove forming the base (x) is formed so that a height ratio $hx_1/hyz_1$ is kept in a range of 1.05 to 1.5, $hx_1$ becomes larger than $hyz_1$, and the above groove becomes deeper than a V-shaped groove forming other bases (y and z).

Moreover, FIGS. 11 and 12 show enlarged views of a pair of triangular-pyramidal retroreflective elements selected out of the triangular-pyramidal cube-corner retroreflective element groups shown in FIGS. 9 and 10.

FIGS. 11 and 12 show a pair of triangular-pyramidal cube-corner retroreflective elements in which this pair of triangular-pyramidal. cube-corner retroreflective elements partitioned by three lateral faces (faces $a_1$, $b_1$, and can; faces $a_2$, $b_2$, and $c_2$; ...) almost perpendicularly intersecting each other because V-shaped grooves having substantially-symmetric cross sections intersect each other have substantially optically analogous shapes and thereby, have angles (θ) formed between substantially same optical axes though different from each other in direction by 180° and a vertical line.

The pair of triangular-pyramidal cube-corner retroreflective elements shown in FIGS. 11 and 12 particularly have the following features:

<1> a bottom face (S–S') including bases (z,z, ...) of faces $a_1$ and $a_2$ and bases (y,y, ...) of faces $b_1$ and $b_2$ of two retroreflective elements $R_1$ and $R_2$ and a bottom face (Sx–Sx') including bases (x,x, ...) shared by faced faces $c_1$ and $c_2$ of the two retroreflective elements are not kept at the same level but the bottom face (Sx–Sx') is deeper than the bottom face (S–S') in the case of the mode in FIGS. 11 and 12, and <2> areas of the faced faces $c_1$ and $c_2$ of the two retroreflective elements $R_1$ and $R_2$ are different from each other and an offset is provided for the position of a V-shaped groove (x) so that area of the faces $c_1$ becomes larger than the area of the face $c_2$.

Moreover, the mode in FIGS. 11 and 12 shows a pair of triangular-pyramidal cube-corner retroreflective elements ($R_1$ and $R_2$) in which optical axes of this pair of triangular-pyramidal cube-corner retroreflective elements ($R_1$ and $R_2$) have substantially same tilts (θ) though different from each other in direction by 180° and an optical axis ($t_1$) of one-side element ($R_1$) of the triangular-pyramidal reflective element tilts in a direction in which the difference ($q_1-p_1$) between the distance ($q_1$) from the intersection ($Q_1$) of the optical axis ($t_1$) and the common bottom face (S–S') up to a plane (Lx–Lx') including the base (x) shared by the element pair and vertical to the common bottom face (S–S') and the distance ($p_1$) from the intersection ($P_1$) of a vertical line extended from the apex ($H_1$) of the element to the common bottom face (S–S') and the bottom face (S–S') up to the vertical plane (Lx–Lx') becomes plus (+). Moreover, in the case of the other-side element ($R_2$) different from the element ($R_1$) in height, an optical axis ($t_2$) tilts in a direction in which the difference ($q_2-p_2$) between the distance ($q_2$) from the intersection ($Q_2$) of the optical axis ($t_2$) and the common bottom face (S–S') up to the plane (Lx–Lx') including the base (x) shared by the element pair and vertical to the common bottom face (S–S') and the distance ($P_2$) from the intersection ($P_2$) of the bottom face (S–S') extended from the apex ($H_2$) of the element to the common bottom face (S–S') and the bottom face (S–S') up to the vertical plane (Lx–Lx') becomes plus (+). Optical axes of these elements have substantially same tilt angles (θ) though different from each other in direction by 180°.

FIGS. 13 to 15 show a triangular-pyramidal cube-corner retroreflective element that is another mode of the present invention.

FIGS. 13 to 15 show a triangular-pyramidal cube-corner retroreflective sheeting in which a pair of triangular-pyramidal cube-corner retroreflective elements partitioned by three lateral faces (faces $a_1$, $b_1$, and $c_1$; faces $a_2$, $b_2$, and $c_2$; ...) almost perpendicularly intersecting each other because V-shaped grooves having substantially-symmetric cross sections intersect each other have faced lateral faces (faces $c_1$ and $c_2$) different from each other in shape and heights ($hx_1$ and $hx_2$) from the common bottom face (S–S') including bases (z and z) of one-side bottom faces (faces $a_1$ and $a_2$) and bases (y and y) of the other-side lateral faces (faces $b_1$ and $b_2$) of a pair of retroreflective elements up to apexes ($H_1$ and $H_2$) are different from each other.

FIG. 15 shows a pair of triangular-pyramidal retroreflective elements ($R_1$ and $R_2$) in which, when assuming that the height from a bottom face (Sx–Sx') including bases (x,x, ...) shared by faced lateral faces (faces $c_1$ and $c_2$) of the triangular-pyramidal retroreflective elements ($R_1$ and $R_2$) up to a apex ($H_1$) of the triangular-pyramidal retroreflective elements is $hx_1$ and the height from a common bottom face (S–S') including bases (z and z) of one-side lateral faces (faces $a_1$ and $a_2$) and bases (y and y) of the other-side lateral faces (faces $b_1$ and $b_2$) up to the apex ($H_1$) of the two triangular-pyramidal retroreflective elements is $hyz_1$, $hx_1$ is smaller than $hyz_1$, and the height $hx_1$ from the common bottom face (Sx–Sx') up to the apex ($H_1$) is larger than a height $hx_2$ of other apex ($H_2$). In this case, each triangular-pyramidal retroreflective element is formed so that a height ratio $hx_1/hyz_1$ is kept in a range of 0.67 to 0.95, $hx_1$ is smaller than $hyz_1$, and a V-shaped groove forming the base (x) is shallower than a V-shaped groove forming other bases (y and z).

FIG. 14 shows a triangular-pyramidal cube-corner retroreflective sheeting in which a pair of triangular-pyramidal cube-corner retroreflective elements partitioned by three lateral faces (faces $a_1$, $b_1$, and $c_1$; $a_2$, $b_2$, and $c_2$; . . . ) almost perpendicularly intersecting each other because V-shaped grooves having substantially-symmetric cross sections intersect each other have substantially optically analogous shapes and thereby, the pair of triangular-pyramidal cube-corner retroreflective elements have angles (θ) formed between substantially same optical axes though different from each other in direction by 180° and a vertical line.

In this case, the common base (x) of faced faces (faces $c_1$, and $c_2$) of a pair of triangular-pyramidal retroreflective elements ($R_1$ and $R_2$) is formed so as to pass through separate positions ($A_2$ and $B_2$) without passing through a set of corresponding intersections ($A_0$ and $B_0$) of a rhombic bottom face ($A_0$-$C_1$-$B_0$-$C_2$) formed by two other bases (y and z) and the distance (offset value) between a line segment ($A_0$-$B_0$) and a line segment ($A_2$-$B_2$) can be properly selected in a range of ±2 to ±20% of the distance between other corresponding intersections ($C_1$ and $C_2$) of two retroreflective elements ($R_1$ and $R_2$). As a result, heights ($hx_1$ and $hx_2$) from the bottom face (Sx–Sx') up to apexes ($H_1$ and $H_2$) are different from each other and moreover, two faced lateral faces ($c_1$: $J_1$-$J_2$-$K_2$-$K_1$-$H_1$) and other lateral face ($c_2$: $J_2$-$H_2$-$K_2$) have shapes different from each other, and the face $c_1$ of the retroreflective element ($R_1$) becomes larger than the face $c_2$ of the other retroreflective element ($R_2$). Moreover, a pair of triangular-pyramidal cube-corner retroreflective elements of the present invention have substantially same optical-axis tilts (θ) though different from each other in direction by 180° and it is permitted that an optical axis ($t_1$) of one-side element ($R_1$) of the pair of triangular-pyramidal reflective elements tilts in a direction in which the difference ($q_1-p_1$) between the distance ($q_1$) from the intersection ($Q_1$) of the optical axis ($t_1$) and the common bottom face (S–S') up to a plane (Lx–Lx') including a base (x) shared by the pair of elements and vertical to the common bottom face (S–S') and the distance ($p_1$) from the intersection ($P_1$) of a vertical line extended from a apex ($H_1$) of the elements to the common bottom face (S–S') and the common bottom face (S–S') up to the vertical plane (Lx–Lx') becomes minus (−) (hereafter, this mode is referred to as minus-tilt (−) triangular-pyramidal retroreflective element). Moreover, in the case of the otherside element ($R_2$) different from the element ($R_1$) in height, it is permitted that an optical axis ($t_2$) tilts in a direction in which the difference ($q_2-p_2$) between the distance ($q_2$) from the intersection ($Q_2$) of the optical axis ($t_2$) and the common bottom face (S–S') up to a plane (Lx–Lx') including a base (x) shared by faced faces (faces $c_1$ and $c_2$) of the elements and vertical to the common bottom face (S–S') and the distance ($P_2$) from the intersection ($P_2$) of a vertical line extended from the apex ($H_2$) of the elements to the common bottom face (S–S') and the bottom face (S–S') up to the vertical plane (Lx–Lx') becomes minus (−). These elements have substantially same optical-axis tilts (θ) though different from each other in direction by 180°.

Moreover, FIGS. 16 to 18 show a pair of triangular-pyramidal cube-corner retroreflective elements of still another mode of the present invention.

FIGS. 16 to 18 show a triangular-pyramidal cube-corner retroreflective sheeting in which a pair of triangular-pyramidal cube-corner retroreflective elements partitioned by three lateral faces (faces $a_1$, $b_1$, and $c_1$; faces $a_2$, $b_2$, and $c_2$; . . . ) almost-perpendicularly intersecting each other because V-shaped grooves having substantially-symmetric cross sections intersect each other have faced lateral faces (faces $c_1$ and $c_2$) different from each other in shape and heights from the common bottom face (S–S') of a pair of retroreflective elements ($R_1$ and $R_2$) up to apexes ($H_1$ and $H_2$) of the reflective elements ($R_1$ and $R_2$) are different from each other.

FIG. 18 shows a pair of triangular-pyramidal retroreflective elements ($R_1$ and $R_2$) in which, when assuming that the height from a base (Sx–Sx') shared by faced lateral faces (faces $c_1$ and $c_2$) of the triangular-pyramidal retroreflective elements ($R_1$ and $R_2$) up to a apex ($H_1$) of the two elements is $hx_1$ and the height from a common bottom face (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, $hx_1$ is equal to $hyz_1$ and the height ($hx_1$) from the bottom face (Sx–Sx') up to the apex ($H_1$) is larger than the height ($hx_2$) from the bottom face (Sx–Sx') up to other apex ($H_2$).

FIG. 17 shows a triangular-pyramidal cube-corner retroreflective sheeting in which a pair of triangular-pyramidal cube-corner retroreflective elements partitioned by lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other have substantially optically analogous shapes and thereby, this pair of triangular-pyramidal cube-corner retroreflective elements ($R_1$ and $R_2$) have angles (θ) formed between substantially same optical axes though different from each other in direction by 180° and a vertical line.

In the case of the mode in FIGS. 16 to 18, a common base (x) of two faced faces (faces $c_1$ and $c_2$) of two reflective elements is formed so as to pass through positions ($A_2$ and $B_2$) from a set of corresponding intersections ($A_0$ and $B_0$) of a rhombic bottom face ($A_0$-$C_1$-$B_0$-$C_2$) formed by two other bases (y and z) without passing through the intersections ($A_0$ and $B_0$). Therefore, the distance (offset value) between a line segment ($A_0$-$B_0$) and a line segment ($A_2$-$B_2$) can be properly selected in a range of ±2 to ±20% of the distance between two other corresponding intersections ($C_1$ and $C_2$). As a result, heights from the common bottom face (S–S') of the two elements ($R_1$ and $R_2$) up to the apexes ($H_1$ and $H_2$) are different from each other and two lateral faces ($c_1$: $A_2$-$B_2$-$H_1$) and other lateral face ($c_2$: $A_2$-$H_2$-$B_2$) have shapes and areas different from each other.

In the case of the pair of elements shown in FIG. 17, V-shaped grooves forming the common base (x) and other bases (y and z) of faced faces of two elements are formed so that heights $hx_1$ and $hyz_1$ are equal to each other. Therefore, other lateral faces ($a_1$ and $b_1$) of the element ($R_1$) are cut off by V-shaped grooves (y and z) forming lateral faces ($a_2$ and $b_2$) of other element ($R_2$) and lateral faces ($A_0$-$A_2$-$H_1$ and $B_0$-$B_2$-$H_1$) not contributing to retroreflection may be formed.

Moreover, the pair of triangular-pyramidal cube-corner retroreflective elements shown in FIG. 18 have substantially same optical-axis tilts (θ) though different from each other in direction by 180° and furthermore, the optical axis ($t_1$) of one-side element ($R_1$) of the pair of triangular-pyramidal reflective elements tilts in a direction in which the difference ($q_1-p_1$) between the distance from the intersection ($Q_1$) of the optical axis ($t_1$) and the common bottom face (S–S') up to a plane (Lx–Lx') including a base (x) shared by the pair of elements and vertical to the common bottom face (S–S') and the distance ($p_1$) from the intersection ($P_1$) of a vertical line extended from the apex ($H_1$) of the elements to the common bottom face (S–S') and the bottom face (S–S') up to the vertical plane (Lx–Lx') become plus (+). Moreover, the optical axis ($t_2$) of the other element ($R_2$) different from the element ($R_1$) in height tilts in a direction in which the difference ($q_2-p_2$) between the distance from the intersection ($Q_2$) of the optical axis ($t_2$) and the common bottom face (S–S') up to a plane (Lx–Lx') including a base (x) shared by the elements and vertical to the common bottom face (S–S') and the distance from the intersection ($P_2$) of a vertical line extended from a apex ($H_2$) of the elements and the lane up to the vertical plane (Lx–Lx') becomes plus (+). Though directions of tilt angles of optical axes of these elements are different from each other by 180°, the elements have substantially same optical-axis tilts ($\theta$).

Moreover, FIG. 19 shows a triangular-pyramidal cube-corner retroreflective sheeting of still another mode of the present invention.

Moreover, FIG. 19 shows a triangular-pyramidal cube-corner retroreflective sheeting in which a pair of triangular-pyramidal cube-corner retroreflective elements partitioned by three lateral faces (faces $a_1$, $b_1$, and $c_1$; faces $a_2$, $b_2$, and $c_2$, . . . ) almost perpendicularly intersecting each other because V-shaped grooves having substantially-symmetric cross sections intersect each other are arranged in a closet-packed state so as to protrude to one side on a common bottom face (S–S'), the faced faces (faces $c_1$ and $c_2$) of this pair of triangular-pyramidal retroreflective elements share a base (x), the common bottom face (S–S') is a common face including bases (z and z) of one-side lateral faces (faces $a_1$ and $a_2$) and bases (y and y) of the other-side lateral faces (faces $b_1$ and $b_2$) of this pair of triangular-pyramidal retroreflective elements, and this pair of triangular-pyramidal retroreflective elements sharing the base (x) have the faced lateral faces (faces $c_1$ and $c_2$) different from each other in shape, and heights ($hx_1$ and $hx_2$) from the common base (S–S') up to a apex are different from each other.

In FIG. 19, however, bases (x,x,x, . . . of V-grooves are formed so that they do not match lines ($x_0,x_0,x_0$, . . . ) passing through a set of corresponding intersections of a rhombic bottom face formed by two other bases (y and z) but they pass through separate positions and distances (offset values) between lines ($x_0$) and bases (x) of V grooves are arranged at right and left of lines ($x_0,x_0,x_0$, . . . ) every other one of V-shaped grooves (x,x,x, . . . ). As a result, a same number of elements respectively having a large height up to a apex are formed at right and left and a triangular-pyramidal cube-corner retroreflective sheeting optically uniform at right and left can be formed.

The pitch between one-directional V-shaped grooves (x,x,x . . . ) forming a group of triangular-pyramidal retroreflective elements of the present invention matches the distance between a set of corresponding intersections of a rhombic bottom face ($A_0$-$C_1$-$B_0$-$C_2$) formed by two sets of bases (y and y, and z and z) in two other directions. By providing a slight deviation for the pitch between the V-shaped grooves (x,x,x, . . . ), it is possible to provide an offset {for example, distance between line segment ($A_0,B_0$) and line segment ($A_2,B_2$)} for the base (x) of a V-groove. Moreover, the offset value slowly increases proportionally to the number of V-shaped grooves (x,x,x, . . . ) as cutting of the V-shaped grooves (x,x,x, . . . ) is repeated. As a result, it is possible to slowly change the asymmetry of triangular-pyramidal retroreflective elements ($R_1$ and $R_2$) to be generated.

In general, when rays pass through a very-small opening, spread is provided for the rays in accordance with the diffraction effect at an intensity inversely proportional to the area of the opening. The spread improves the visibility of reflected light for an observer (driver) present at a position separate from a light source (headlight,) (improvement of observation angularity). In the case of a triangular-pyramidal retroreflective element, an opening through which rays pass denotes an other face (element bottom face) enclosed by three lateral faces (faces $a_1$, $b_1$, and $c_1$ or faces $a_2$, $b_2$, and $c_2$) of a triangular pyramid and the area of the face changes proportionally to the height; of the element. When the height of the element becomes smaller, the opening area decreases. Therefore, the spread of reflected light increases as the diffraction effect increases. According to calculation based on a computer simulation conforming to the light tracking method, when the height of an element becomes 50 $\mu$m or less, spread of reflected light increases. However, excessively small element dimension lowers a retroreflection intensity in the front direction through which light is incoming.

In the case of a pair of triangular-pyramidal retroreflective elements of the present invention, heights ($hx_1$ and $hx_2$) from a common bottom face (Sx–Sx') up to the two elements ($R_1$ and $R_2$) are different from each other. Therefore, right and left elements can have opening areas different from each other and an element having a small height can obtain spread of retroreflected light according to the diffraction effect. Thus, the observation angularity is improved. However, in the case of an element having a large height, the diffraction effect does not become excessive but a retroreflection intensity is maintained. Therefore, it is possible to obtain a triangular-pyramidal cube-corner retroreflective sheeting superior in both observation angularity and reflection intensity as a whole.

Moreover, according to a triangular-pyramidal retroreflective element of the present invention, as shown in FIGS. 9 to 10 and FIGS. 13 to 15, it is possible to obtain a triangular-pyramidal cube-corner retroreflective sheeting in which faced right and left elements are different from each other in height. As a result, it is possible to obtain a new triangular-pyramidal cube-corner retroreflective sheeting in which retroreflective characteristic of rays incoming from right and left are different from each other. Every optical axis of a group of large-height elements arranged at the right side in FIGS. 9 and 10 tilts rightward and thereby, shows a superior retroreflective characteristic in the right direction and every optical axis of a group of small-height elements arranged at the left side in FIGS. 9 and 10 tilts leftward and thereby, shows superior observation angularity in right and left directions.

An optical axis ($t_1$) of a pair of triangular-pyramidal retroreflective elements of the present invention tilts in a direction in which the difference ($q_1-p_1$) between the distance ($q_1$) from the intersection ($Q_1$) of the optical axis ($t_1$) and the bottom face (S–S') of up to a plane (Lx–Lx') including the base (x) shared by the pair of elements and vertical to the common bottom face (S–S') and the distance ($p_1$) from the intersection ($P_1$) of a vertical line extended from a apex ($H_1$) of the elements to the common bottom face (S–S') up to the vertical plane (Lx–Lx') becomes plus (+) or minus (−) so that an angle ($\theta$) formed between the optical axis ($t_1$) and the vertical line becomes 0.5 to 12°, preferably 0.6 to 10°, or more preferably 0.6 to 1.5°. As a result, because the optical axis is tilted, retroreflection brightness is not easily deteriorated even for a large entrance angle.

As shown in FIGS. 9 to 12, when assuming that heights from a bottom face (Sx–Sx') including bases (x,x, . . . ) shared by faced lateral faces (faces $c_1$ and $c_2$) of each pair of triangular-pyramidal retroreflective elements ($R_1$ and $R_2$) of the present invention up to apexes ($H_1$ and $H_2$) of the triangular-pyramidal retroreflective elements ($R_1$ and $R_2$) are $hx_1$ and $hx_2$ and the height from a common bottom face (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements ($R_1$ and $R_2$) up to the apex ($H_1$) is $hyz_1$, various improvements of optical characteristics are obtained because triangular-pyramidal retroreflective elements having $hx_1$ substantially larger than $hyz_1$ are formed so that a ratio $hx_1/hyz_1$ is kept a range of 1.05 to 1.5 or preferably 1.07 to 1.4.

These improvements can be achieved because $hx_1$ is substantially larger than $hyz_1$ and thereby, it is possible to increase the area of the face $c_1$ compared to the faced lateral faces (faces $c_1$ and $C_2$ in FIG. 11) of the prior art in which $hx_1$ is equal to $hyz_1$. Particularly, light incoming at an angle almost vertical to the face $c_1$, in other words, in the case of a large entrance angle, entrance angularity is remarkably improved because the area of the face $c_1$ is increased.

Moreover, improvement of optical characteristics according to increase of the area of the face $c_1$ is particularly remarkable for a triangular-pyramidal retroreflective element, above all, when the optical axis of the element tilts in a direction in which the difference (q–p) between distances (p) and (q) becomes plus.

When tilting a normal triangular-pyramidal reflective element having an untilted optical axis so that the above (q–p) becomes plus, disadvantages appear that areas of lateral faces ($c_1$ and $c_2$) having a common base (x) become smaller than those of faces $c_1$ and $c_2$ of an element having an untilted optical axis and a probability for rays to three-face-reflect and retroreflect lowers. However for incoming rays to reflect on three faced lateral faces (faces $c_1$ and $c_2$ in FIG. 14) and efficiently retroreflect, it is preferable that areas of the three lateral faces are equal to each other. However, in the case of a triangular-pyramidal reflective element having $hx_1$ and $hyz_1$ equal to each other, because areas of lateral faces ($c_1$ and $c_2$) having a common base become smaller than those of two other faces ($a_1$ and $b_1$, and $a_2$ and $b_2$) as a tilt angle increases, the above-described probability for rays to three-face-reflect and retroreflect is lowered. Therefore, not only the retroreflective performance of light incoming from front (front reflection brightness) lowers but also the retroreflective performance when an entrance angle increases (entrance angularity) lowers.

Moreover, in the present invention, when an optical axis tilts so that (q–p) becomes minus on the contrary to the above case, entrance angularity is provided. However, by tilting the optical axis of an element so that (q–p) becomes minus, disadvantages appear that areas of lateral faces ($c_1$ and $c_2$) having a common base (x) becomes extremely larger than those of the lateral faces before tilted and the probability for rays to three-face-reflect and retroreflect lowers.

A pair of triangular-pyramidal retroreflective elements of the present invention having a minus tilt are formed so that, when assuming that the height from a bottom face (Sx–Sx') including bases (x,x,x . . . ) shared by faced lateral faces (faces $c_1$ and $c_2$) of the triangular-pyramidal retroreflective elements up to a apex ($H_1$) of the triangular-pyramidal retroreflective elements is $hx_1$ and the height from a common bottom face (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, $hx_1$ is substantially smaller than $hyz_1$ and the ratio $hx_1/hyz_1$ is kept in a range of 0.67 to 0.95, preferably 0.71 to 0.93. Therefore, improvements of various optical characteristics are obtained.

These improvements can be achieved because $hx_1$ is substantially smaller than $hyz_1$ and it is possible to decrease the area of the face $c_1$ compared to the lateral face $c_1$ of the prior art in which $hx_1$ is equal to $hyz_1$.

Moreover, for the present invention, a cube-corner retroreflective sheeting is preferable which has triangular-pyramidal reflective elements in which distances ($hx_1$ and $hx_2$) from the bottom face (Sx–Sx') including bases (x,x, . . . ) of triangular-pyramidal cube-corner retroreflective elements protruding beyond the bottom face (Sx–Sx') up to apexes ($H_1$ and $H_2$) of the triangular-pyramidal reflective elements range between 30 and 400 µm, more preferably between 50 and 200 µm, or particularly between 60 and 100 µm.

When either of the heights ($hx_1$ and $hx_2$) of the above reflective elements is less than 30 µm, divergence of retroreflected light become excessive due to the diffraction effect determined by an opening area of a reflective element and the retroreflective performance deteriorates. Moreover, a case in which either of the heights ($hx_1$ and $hx_2$) exceeds 400 µm is not preferable because a sheeting thickness becomes excessive and a flexible sheeting cannot be obtained.

Moreover, angles formed between three reflective lateral faces (faces $a_1$, $b_1$, and $c_1$ or faces $a_2$, $b_2$, and $c_2$) of a pair of triangular-pyramidal cube-corner retroreflective elements ($R_1$ and $R_2$) (prism apex angles; $a_1$-$b_1$-face apex angle, $b_1$-$c_1$-face apex angle, and $c_1$-$a_1$-face apex angle, or $a_2$-$b_2$-face apex angle, $b_2$-$c_2$-face apex angle, and $c_2$-$a_2$-face apex angle) are substantially perpendicular to each other. However, the angles are not always accurately perpendicular (90.00°) to each other. It is preferable to provide a very slight angular deviation from a right angle for the prism apex angles in order to improve observation angularity. By providing a very-slight angular deviation for the prism apex angles, it is possible to proper diverge the light retroreflected from an obtained triangular-pyramidal cube-corner retroreflective element and improve the observation angularity.

As a method for providing the angular deviation, to cut three-directional V-shaped grooves (x, y, and z) forming a triangular-pyramidal cube-corner retroreflective element, it is possible to cut the grooves by right-left-symmetrically providing a slight deviation for the angle of at least one-directional V-shaped groove from an angle for a prism apex angle to form a right angle. The method for providing a deviation is achieved by using a right-left-symmetric cutting tool.

As another method for providing the angular deviation, to cut three-directional V-shaped grooves (x, y, and z) forming a triangular-pyramidal cube-corner retroreflective element, it is possible to cut the grooves by right-left-asymmetrically providing a slight deviation for the angle of at least one-directional V-shaped groove from an angle for a prism apex angle to form a right angle. The method for providing a deviation is achieved by using a right-and-left-asymmetric cutting tool or slightly tilting the tool.

Thus, by providing a slight deviation for the angle of a V-shaped groove from an angle for a prism apex angle to form a right angle, it is possible to provide a very-slight angular deviation from a right angle (90.00°) for at least one of prism apex angles ($a_1$-$b_1$-face apex angle, $b_1$-$c_1$-face apex angle, and $c_1$-$a_1$-face apex angle or $a_2$-$b_2$-face apex angle, $b_2$-$c_2$-face apex angle, and $c_2$-$a_2$-face apex angle). Thereby, it is possible to properly diverge the light reflected from a triangular-pyramidal reflective element from a complete retroreflective direction. It is preferable to deviate the angle of a V-shaped groove so that at least one prism apex angle is slightly deviated from 90.00° in a range of ±(0.01° to 0.4°) or preferably in a range of ±(0.001° to 0.2°).

It is possible to generally manufacture a triangular-pyramidal cube-corner retroreflective sheeting of the present invention by forming the sheeting into a concave shape in which the shape of the above-described triangular-pyramidal reflective element is inverted, using cube-corner molding dies arranged on a metallic belt in a closest-packed state, heating and pressing a flexible proper resin sheeting superior in optical transparency and uniformity against the molding dies, and inversely transferring the shape of the dies to the resin sheeting.

A typical manufacturing method of the cube-corner molding die is disclosed in, for example, the Stamm's U.S. Pat. No. 3,712,706 in detail and the present invention can also use a method according to the above method.

Specifically, for example, a matrix of a microprism is formed by using a hard cutting tool (e.g. diamond cutting tool or tungsten-carbide cutting tool) having a tip angle of approx. 73.4 to 81.0°, thereby determining each-directional repetitive pitch, groove depths (e.g. $hx_1$ and $hyz_1$, and $hx_2$ and $hyz_2$), and a mutual crossing angle correspondingly to the shape of a purposed triangular-pyramidal reflective element, cutting V-shaped parallel grooves whose depths ($hx_1$ and $hyz_1$, and $hx_2$ and $hyz_2$) are equal to each other and whose cross sections are substantially symmetric on a base material whose surface is smoothly ground, and then cutting the V-shaped parallel grooves in the third direction (x-direction) at a repetitive pitch (repetitive pitch of lines x in FIGS. 9 and 11) for bisecting a supplementary angle of the crossing angle between y- and z-directions (in this case, more-acute angle is referred to as "crossing angle") without passing through the intersection of y- and z-directional formed grooves. In the case of the present invention, it is permitted to set the depths ($hx_1$ and $hx_2$) of x-directional grooves to values equal to the depths ($hyz_1$ and $hyz_2$) of y- and z-directional grooves. However, it is preferable to set the depths ($hx_1$ and $hx_2$) to values smaller or larger than the depths of the y- and z-directional grooves.

In the case of a preferred mode of the present invention, a repetitive pitch in y and z directions ranges between 100 and 810 μm, groove depths ($hyz_1$ and $hyz_2$) range between 50 and 400 μm, a crossing angle ranges between 43 and 45°, and x-directional groove depths ($hx_1$ and $hx_2$) range between 75 and 600 μm.

It is preferable to use a metal having a Vickers hardness (JIS Z 2244) of 350 or more or particularly preferably, a Vickers hardness of 380 or more as the base material of the matrix of the microprism. Specifically, the following metals can be listed: amorphous copper, electrodeposited nickel, and aluminum. As alloy-based materials, the following materials can be listed: copper-zinc alloy (brass), copper-tin-zinc alloy, nickel-cobalt alloy, nickel-zinc alloy, and aluminum alloy.

Moreover, the above base material can use a synthetic resin. Furthermore, as the base material, it is preferable to use a synthetic resin having a glass transition temperature of 150° C. or higher, particularly 200° C. or higher and a Rockwell hardness (JIS Z2245) of 70 or more, particularly 75 or more because a trouble does not easily occur that the resin is softened in cutting and thereby, it is difficult to cut the resin. Specifically, one of the following materials can be use: polyethylene-terephthalate-based resin, polybutylene-phthalate-based resin, polycarbonate-based resin, polymethyl-methacrylate-based resin, polyimide-based resin, polyarylate-based resin, polyether-sulfone-based resin, polyether-imide-based resin, and cellulose--triacetate-based resin.

Then, a metallic film is formed on the obtained microprism matrix by electroforming the surface of the matrix. By removing the metallic film from the matrix surface, it is possible to manufacture a metallic die for forming a triangular-pyramidal cube-corner retroreflective sheeting of the present invention.

Electroforming is generally performed in, for example, an aqueous solution of containing 60 wt % of sulfamic acid at approx. 40° C. and a current condition of approx. 10 A/dm$^2$. A uniform electroformed layer can be easily obtained by setting an electroformed-layer forming rate to, for example, 0.02 mm/hr or less. In the case of a forming rate higher than 0.02 mm/hr, a trouble easily occurs that smoothness of the surface is lost or a deficient portion occurs in an electroformed layer.

Thus, a first-generation electroforming die manufactured from the prism matrix can be repeatedly used as an electroforming master used to manufacture a second-generation electroforming die. Therefore, it is possible to manufacture a plurality of electroforming dies from one prism matrix.

A plurality of manufactured electroforming dies are precisely cut and then, used by combining and joining them up to the final die size for molding a microprism sheeting made of a synthetic resin. This joining method can use a method of simply butting cut ends or a method of welding a combined joint through electron-beam welding, YAG laser welding, or carbon-dioxide-gas laser welding.

A combined electroforming die is used to mold a synthetic resin as a synthetic-resin molding die. The synthetic-resin molding method can use compression molding or injection molding.

Compression molding can be performed by inserting a formed thin-wall nickel electroforming die, a synthetic-resin sheeting having a predetermined thickness, and a silicone-rubber sheeting having a thickness of approx. 5 mm serving as a cushion material into a compression-molding press heated at a predetermined temperature, preheating them for 30 sec at a pressure of 10 to 20% of a molding pressure, then heating and pressing them for approx. 2 min at 180 to 250° C. and 10 to 30 kg/cm$^2$. Thereafter, a molded prism can be obtained by cooling them up to room temperature and releasing the pressure.

Moreover, for example, a continuous sheeting-like product can be obtained by joining a thin-wall electroforming die having a thickness of approx. 0.5 mm formed through the above method to make an endless-belt die, setting and rotating the belt die to and on a pair of rollers comprising a heating roller and a cooling roller, supplying melted synthetic resin to the belt die on the heated roller in the form of a sheeting, pressuring and molding the sheeting by one silicone roller or more, then cooling the molded sheeting on a cooling roller to a transition temperature or lower, and removing the molded sheeting from the belt die.

Then, a mode of a preferred structure of a cube-corner retroreflective sheeting of the present invention is described below by referring to FIG. 20 showing a sectional view of the mode.

In FIGS. 20 and 21, symbol 1 denotes a surface protective layer, 2 denotes a printed layer, 3 denotes a holding-body layer for holding the reflective elements, 4 denotes a reflective-element layer, 5 denotes a support layer and a reflective-element layer, 6 denotes an air layer, 7 denotes a binder layer, 8 denotes a support layer, 9 denotes an adhesive layer, 10 denotes a separating-material layer, 11 denotes an entrance light, and 12 denotes a mirror reflection layer.

In FIG. 20, symbol 4 denotes a reflective-element layer on which triangular-pyramidal reflective elements ($R_1$ and $R_2$) of the present invention are arranged in a closest-packed state, 3 denotes a holding-body layer for holding the reflective elements, and 11 denotes a light incoming direction. The reflective-element layer (4) and holding-body layer (3) are normally united into one body (5). However, it is also permitted to superimpose the layers (4) and (3) each other. It is possible to form the following on a retroreflective sheeting of the present invention in accordance with the purpose and use environment of the retroreflective sheeting: a surface protective layer (1), a printed layer (2) for communicating information to an observer or coloring the sheeting, a binder layer (7) for achieving a sealing structure for preventing moisture from entering the back of a reflective-element layer, a support layer (8) for supporting the binder layer (7), and an adhesive layer (9) and a releasing-liner layer (10) for bonding the retroreflective sheeting to other structure.

It is possible to set the printed layer (2) between the surface protective layer (1) and the holding-body layer (3) or on the surface protective layer (1) or the reflection face (lateral face) of the reflective-element layer (4) normally by means of gravure printing, screen printing, or ink-jet printing.

Any material can be used to constitute the reflective-element layer (4) and holding-body layer (3) as long as the material meets flexibility that is an object of the present invention. However, it is preferable to use a material having optical transparency and uniformity. As materials usable for the present invention, the following can be listed: polycarbonate resin, vinyl chloride resin, (meth)acrylate resin, epoxy resin, styrene resin, polyester resin, fluorine resin, olefin resin such as polyethylene resin or polypropylene resin, cellulose-based resin, and urethane resin. Moreover, it is possible to use ultraviolet absorber, light stabilizer, and antioxidant independently or by combining them in order to improve weatherbility. Furthermore, it is possible to contain various organic pigments, inorganic pigments, fluorescent pigments, dyes, and fluorescent dyes in the material as colorants.

The surface protective layer (1) can use the resin same as that used for the retroreflective-element layer (4). However, in order to improve weather resistance, it is possible to use ultraviolet absorbent, light stabilizer, and antioxidant independently or by combining them. Moreover, it is possible to contain various organic pigments, inorganic pigments, fluorescent pigments, dyes, and fluorescent dyes in the resin as colorants.

In the case of the reflective-element layer (4) of the present invention, it is general to set an air layer (6) on the back of a cube-corner retroreflective element in order to increase a critical angle meeting an internal total reflection condition. To prevent troubles such as decrease of critical angle due to penetration of moisture under a use condition and corrosion of metal, it is preferable that the reflective-element layer (4) and support layer (8) are sealed by the binder layer (7).

The sealing method can use one of the methods disclosed in U.S. Pat. Nos. 3,190,178, 4,025,159, and Japanese Utility Model Laid-Open No. 28,669/1975. The binder layer (7) can use one of (meth)acrylate resin, polyester resin, alkyd resin, and epoxy resin. The joining method can properly use one of publicly-known thermally-fusing-resin joining method, thermosetting-resin joining method, ultraviolet-curing-resin joining method, and electron-beam-curing-resin joining method.

It is possible to apply the binder layer (7) used for the present invention on the entire surface of the support layer (8) or selectively set the layer (7) to a joint with a retroreflective-element layer through a method such as printing method.

As a material constituting the support layer (8), it is possible to use a resin constituting a retroreflective-element layer, a general resin which can be formed into a film, fiber, cloth, and metallic foil or plate of stainless steel or aluminum independently or by combining them.

It is possible to properly use a publicly-known material for the adhesive layer (9) used to attach a retroreflective sheeting of the present invention to a metallic plate, wooden plate, glass plate, or plastic plate and the separating-material layer (10) for the adhesive layer. The above adhesive can use one of a pressure-sensitive adhesive, heat-sensitive adhesive, and cross-linking adhesive. The pressure-sensitive adhesive can use one of polyacrylic ester adhesive obtained by copolymerizing butyl acrylate, 2-ethylhexyl acrylate, isooctyl acrylate, or nonyl acrylate with acrylic acid or vinyl acetate, silicon-resin-based adhesive, and rubber-based adhesive.

Then, a mode of another preferred structure of a cube-corner retroreflective sheeting of the present invention is described by referring to FIG. 21 showing a sectional view of the mode.

In FIG. 21, a metallic mirror-reflection layer (12) is set to the surface of a reflective element (4) and moreover, an adhesive layer (9) and a separating-material layer (10) are directly brought into contact with the mirror-reflection layer (12) as superimposed. The cube-corner retroreflective sheeting of this mode does not require an air layer because it retroreflects light in accordance with the mirror reflection theory and therefore, it does not require a binder layer or support layer.

A triangular-pyramidal cube-corner retroreflective sheeting of the present invention allows the mirror reflection layer (12) made of a metal such as aluminum, copper, silver, or nickel to be formed on the surface of the reflective element (4) by means of vacuum deposition, chemical plating, or sputtering. Among methods for forming the mirror reflection layer (12), a vacuum deposition method using aluminum is preferable because it is possible to lower a vacuum-deposition temperature and thereby, minimize thermal deformation of a retroreflective element in the vacuum-deposition step, and moreover, brightness of color tone of the mirror reflection layer (12) is maximized.

A continuous vacuum-deposition system for the aluminum mirror reflection layer (12) comprises a vacuum vessel capable of keeping a vacuum degree at approx. $7 \times 10^{-4}$ to $9 \times 10^{-4}$ mmHg, an unwinder for unwinding a prism original sheeting constituted of two layers such as a substrate sheeting (5) set in the vacuum vessel and a surface protective layer (1) superimposed on the surface of the substrate sheeting at the light-incoming side, a winder for winding the vacuum-deposited prism original sheeting, and a heater capable of fusing aluminum by an electric heater in a graphite crucible. Pure aluminum pellets having a purity of 99.99 wt % or more are put into the graphite crucible and fused at an AC voltage of 350 to 360 V, a current of 115 to 120A, and a treatment rate of 30 to 70 m/min, and the mirror reflection layer (12) on the surface of the retroreflective element can be vacuum-deposited by aluminum atoms at a thickness of, for example, 800 to 2000 Å.

The present invention is more specifically described below in accordance with embodiments.

DESCRIPTION OF THE PREFERRED EMBODIMENTS

Embodiment 1

Figure 1:
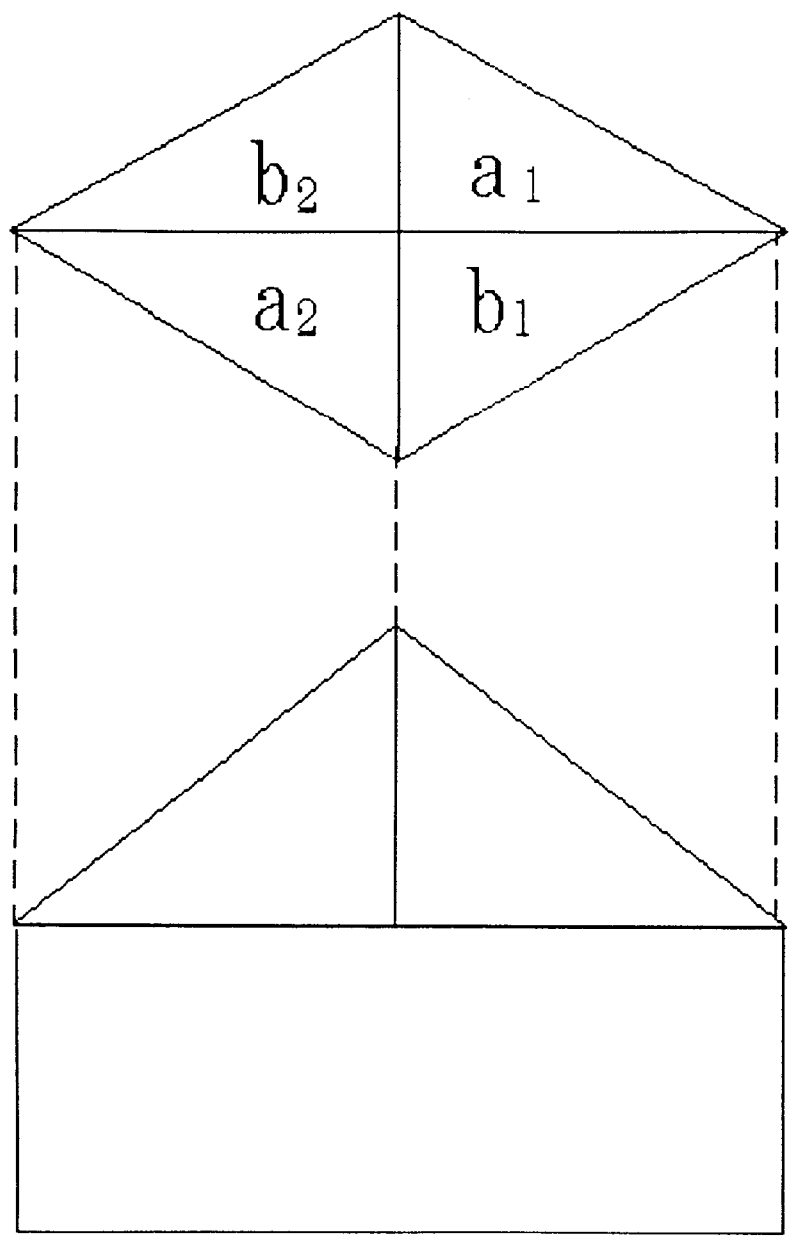
FIG. 1 is an illustration showing a top view and a side view of an intermediate shape whose base shape formed by two-directional V-shaped grooves is rhombic in a triangular-pyramidal retroreflective element of the prior art.
Figure 2:
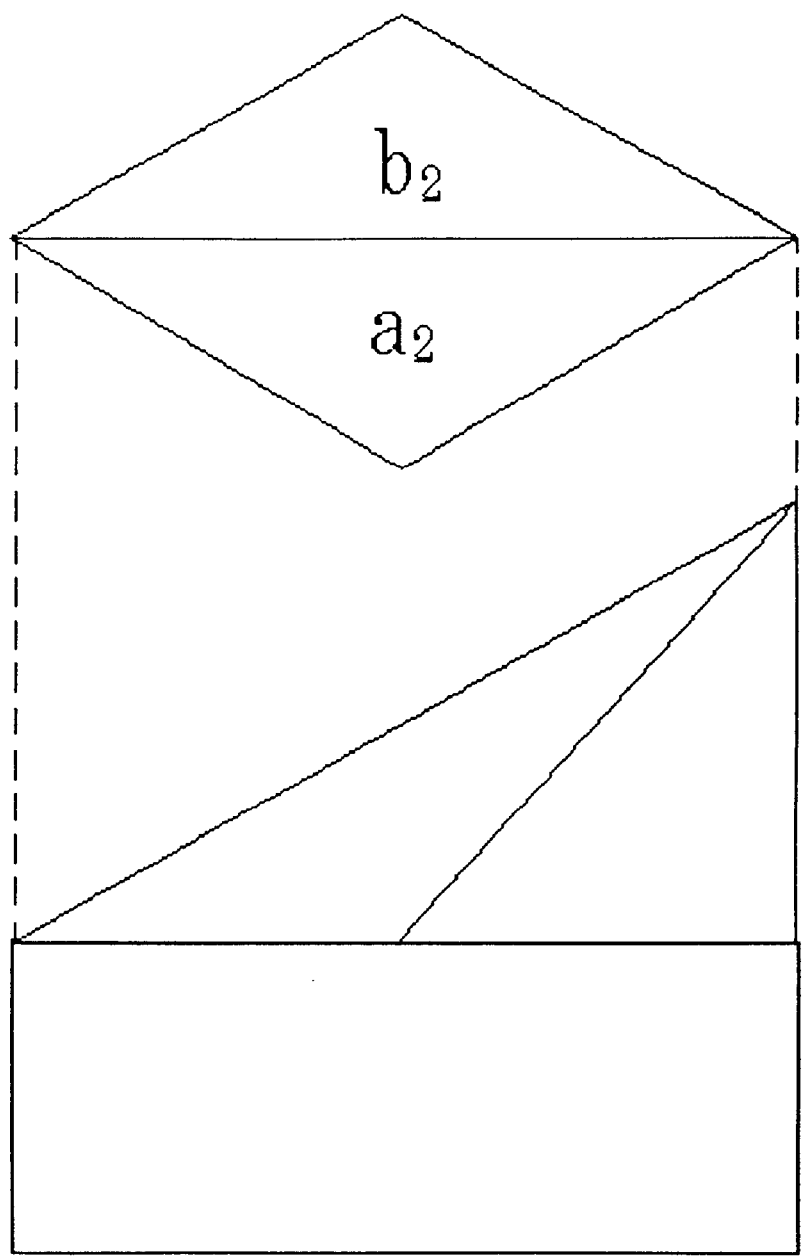
FIG. 2 is an illustration showing a top view and a side view of an intermediate shape whose base shape formed by two-directional V-shaped grooves is rhombic in the triangular-pyramidal retroreflective element shown in the cited example (U.S. Pat. No. 5,600,484)
Figure 3:
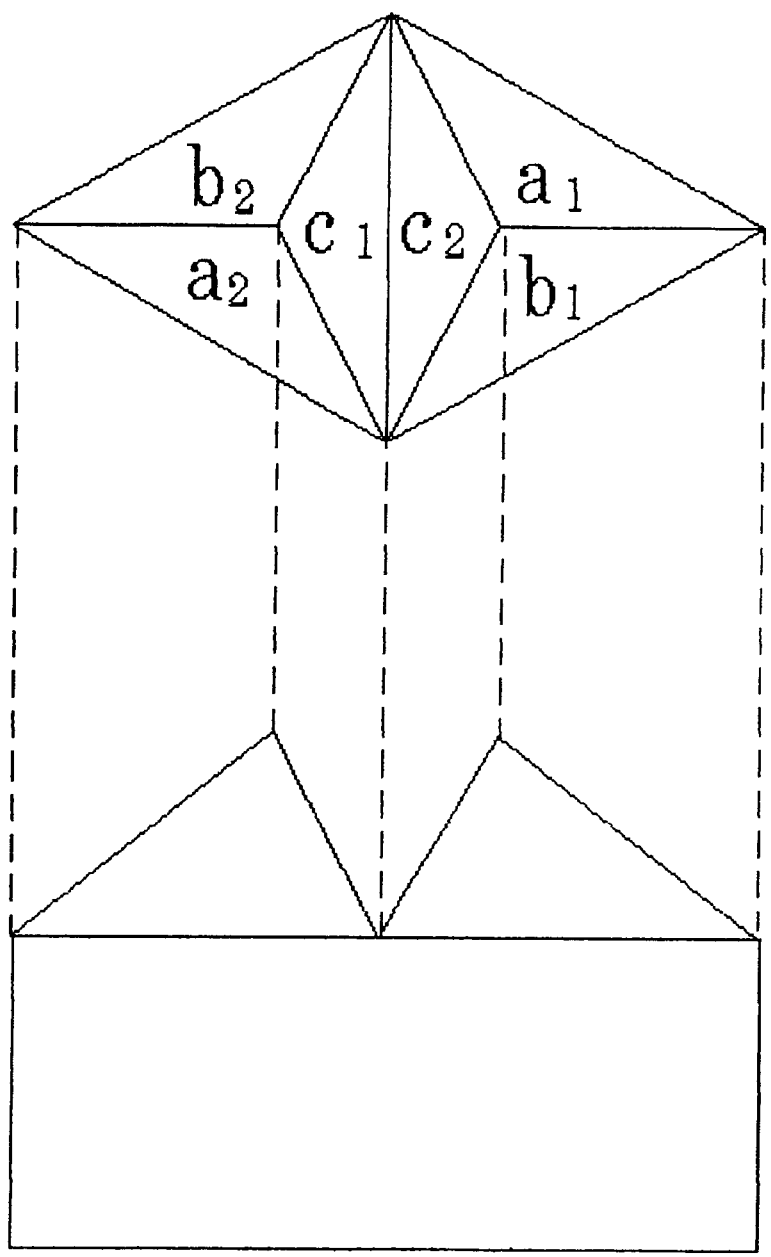
FIG. 3 is an illustration showing a top view and a side view of a triangular-pyramidal retroreflective element of the prior art.
Figure 4:
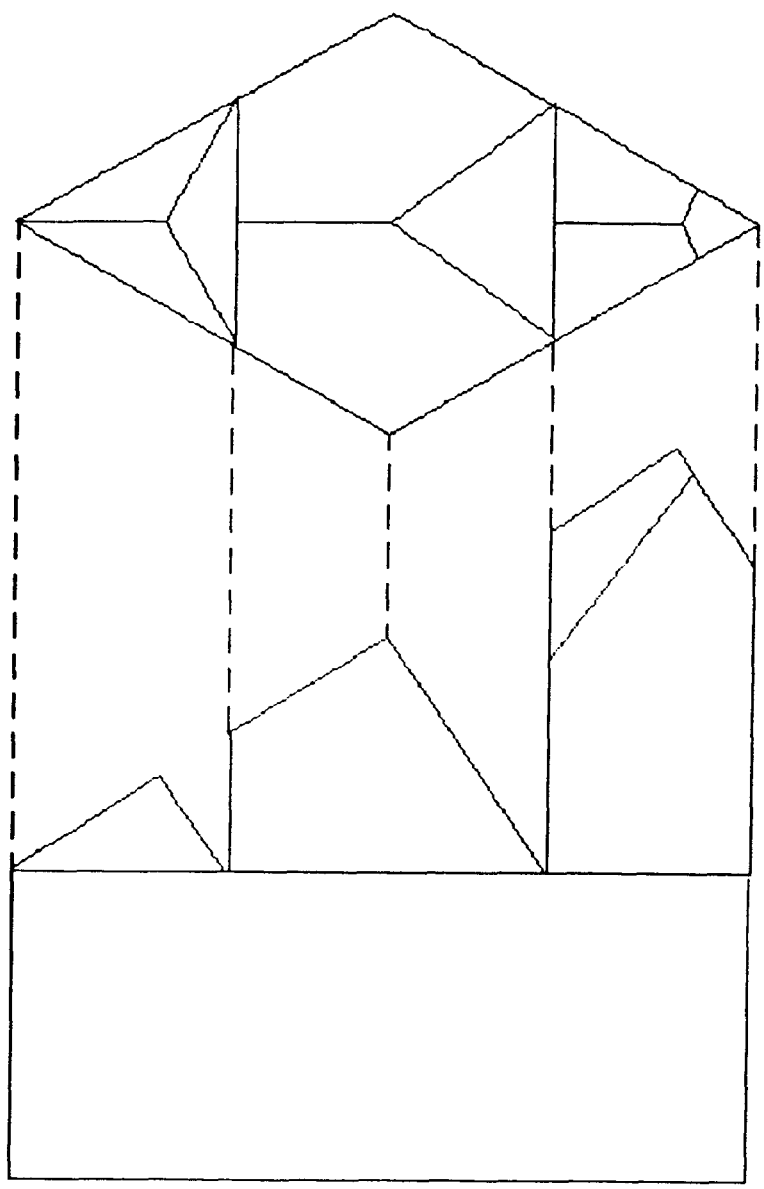
FIG. 4 is an illustration showing a top view and a side view of the triangular-pyramidal retroreflective element described in the cited example (U.S. Pat. No. 5,600,484)
Figure 5:
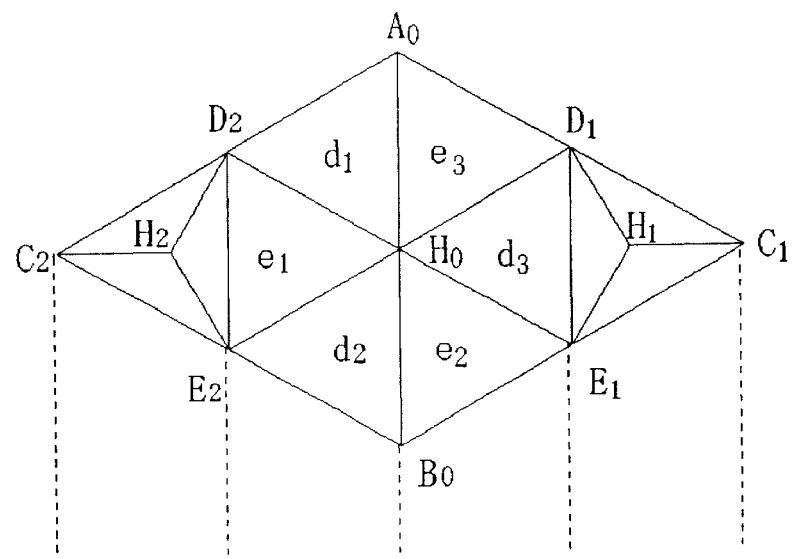
FIG. 5 is a top view of a triangular-pyramidal retroreflective element pair of the prior art.
Figure 6:
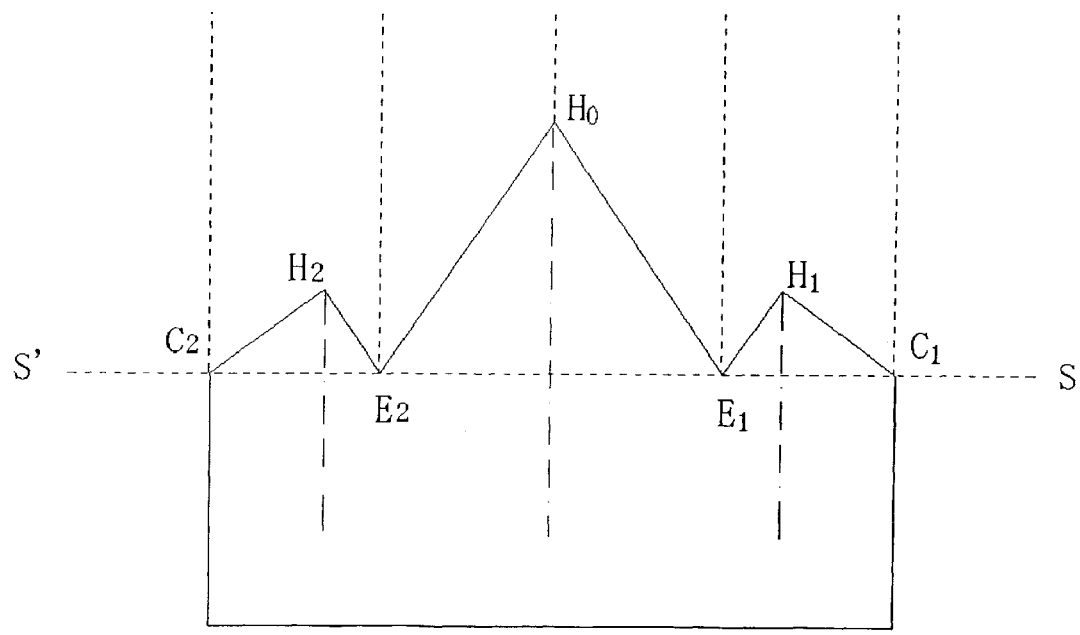
FIG. 6 is a sectional view of the elements in FIG. 5.
Figure 7:
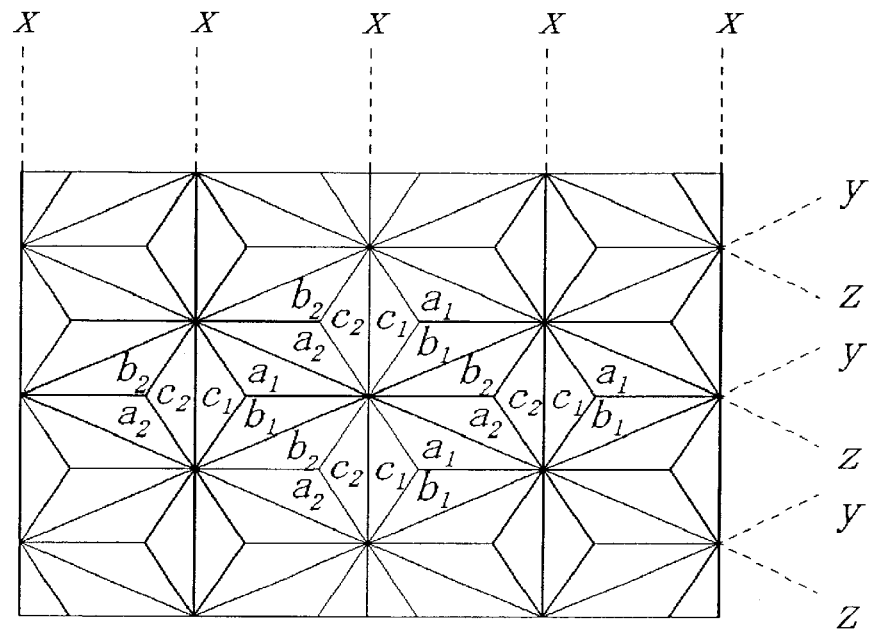
FIG. 7 is a top view of a triangular-pyramidal retroreflective element group of the prior art.
Figure 8:
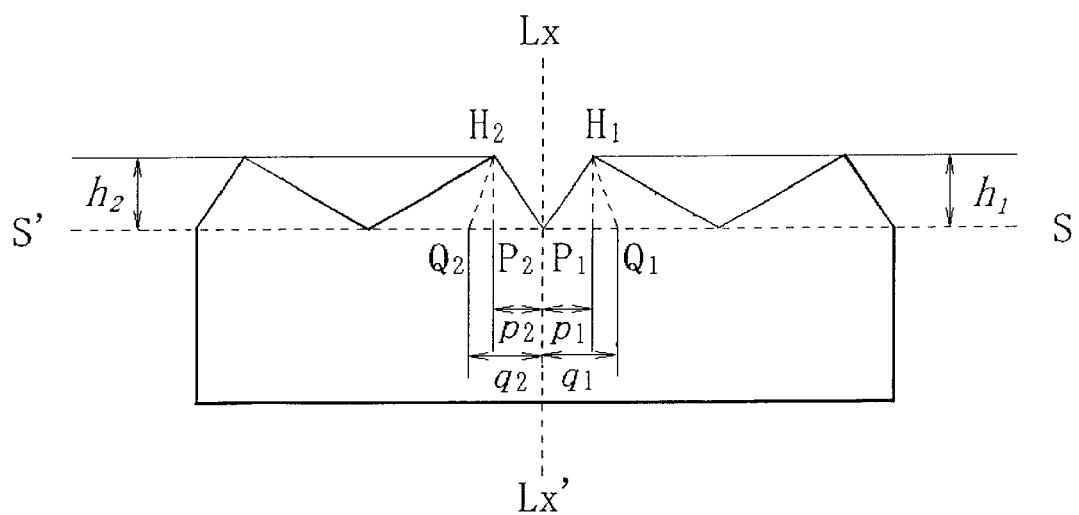
FIG. 8 is a sectional view of the element group in FIG. 7.
Figure 9:
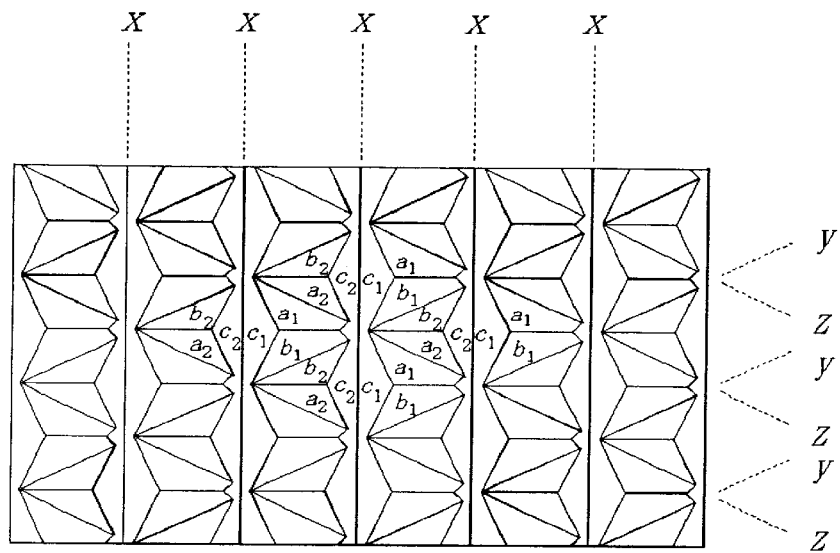
FIG. 9 is a top view of a triangular-pyramidal retroreflective element group of the present invention having a plus tilt.
Figure 10:
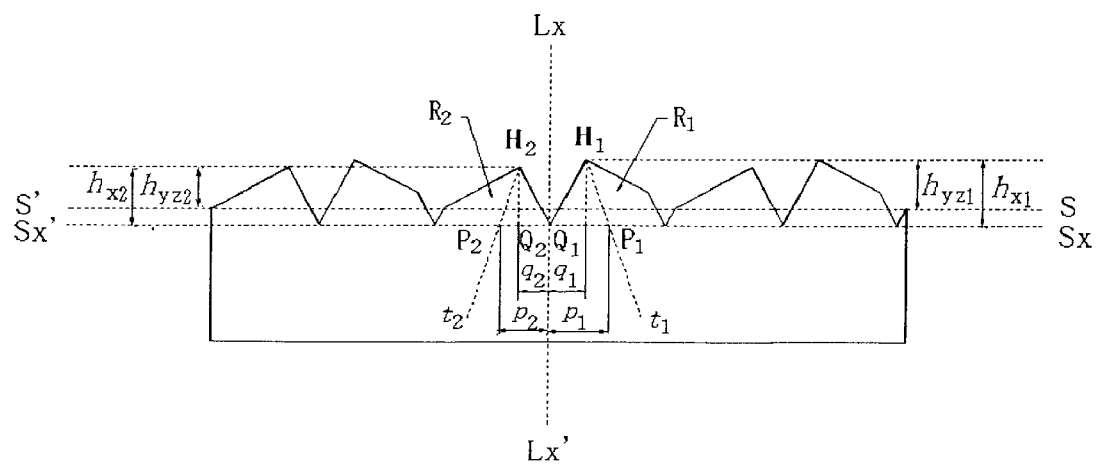
FIG. 10 is a sectional view of the triangular-pyramidal retroreflective element group in FIG. 9.
Figure 11:
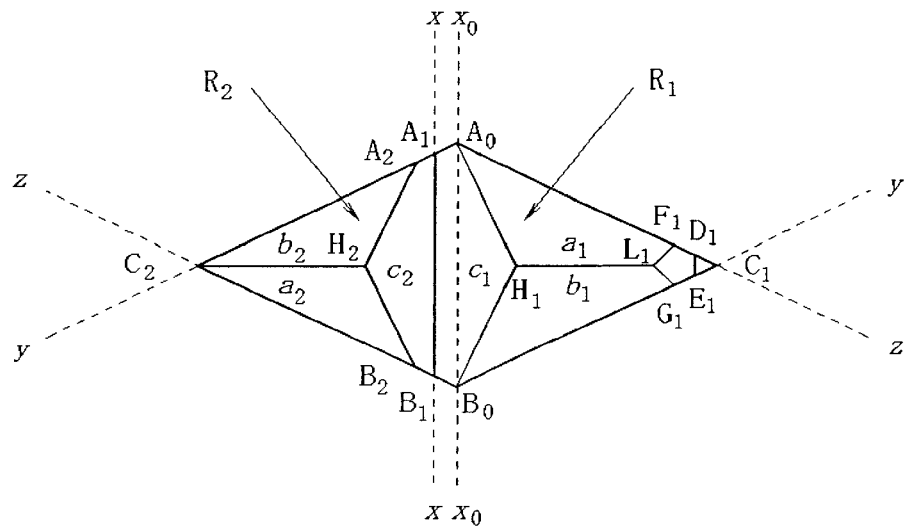
FIG. 11 is a top view of the triangular-pyramidal retroreflective element group in FIG. 9.
Figure 12:
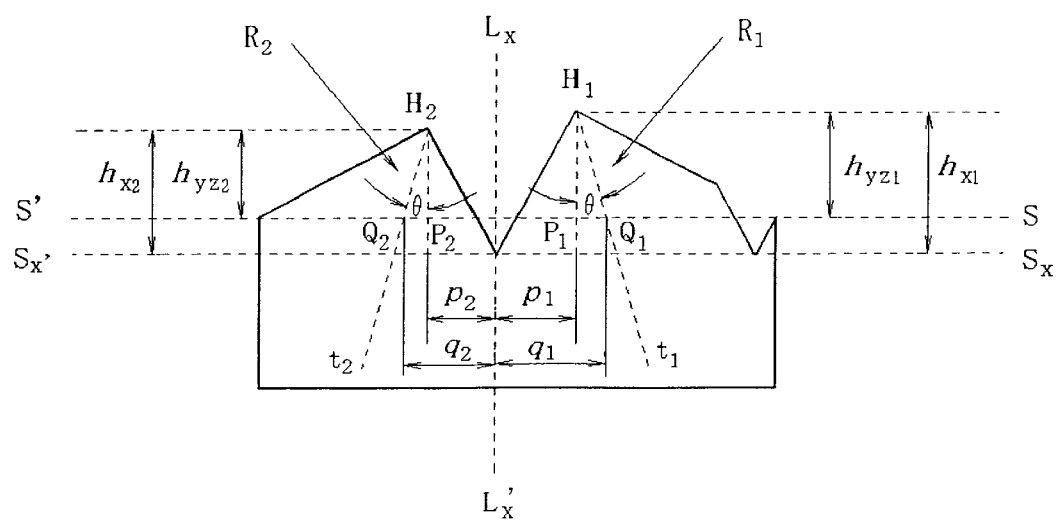
FIG. 12 is a sectional view of the element group in FIG. 11.
Figure 13:
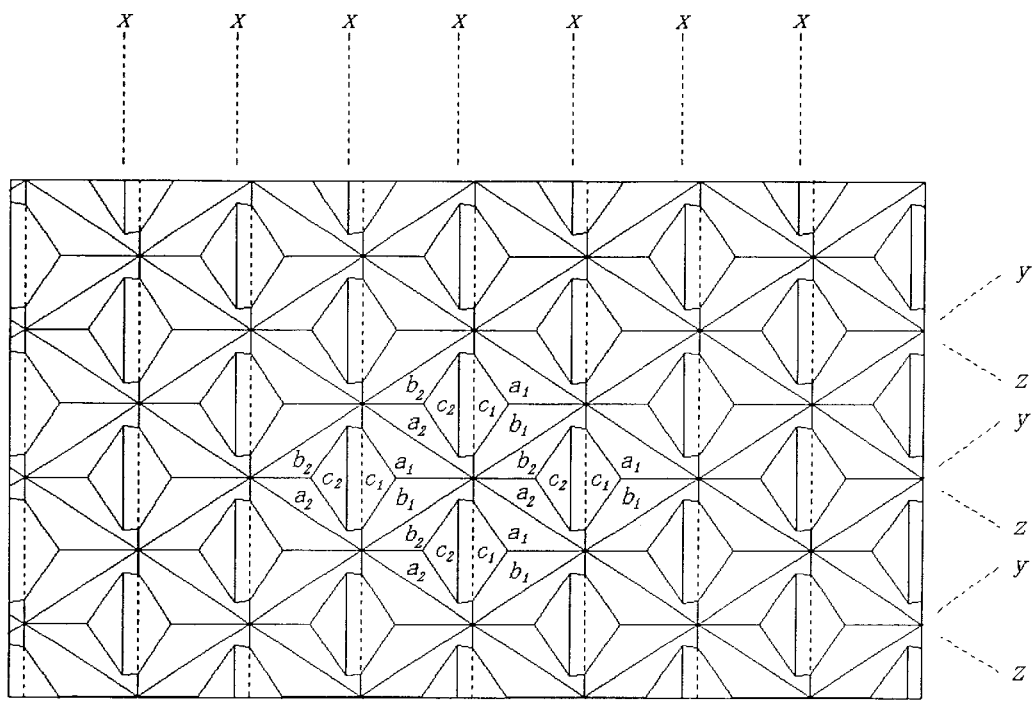
FIG. 13 is a top view of a triangular-pyramidal retroreflective element group of the present invention having a minus tilt.
Figure 14:
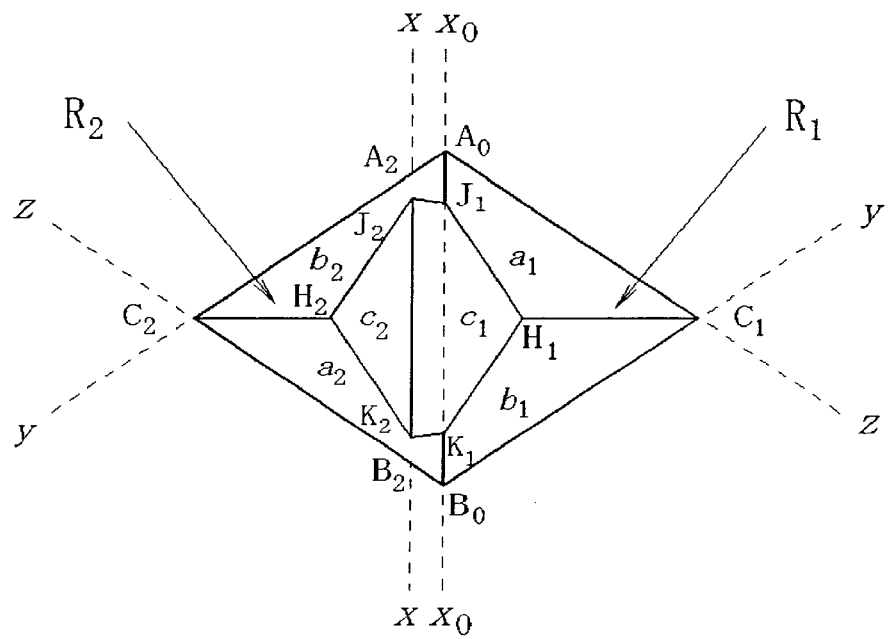
FIG. 14 is a top view of the triangular-pyramidal retroreflective element pair in FIG. 13.
Figure 15:
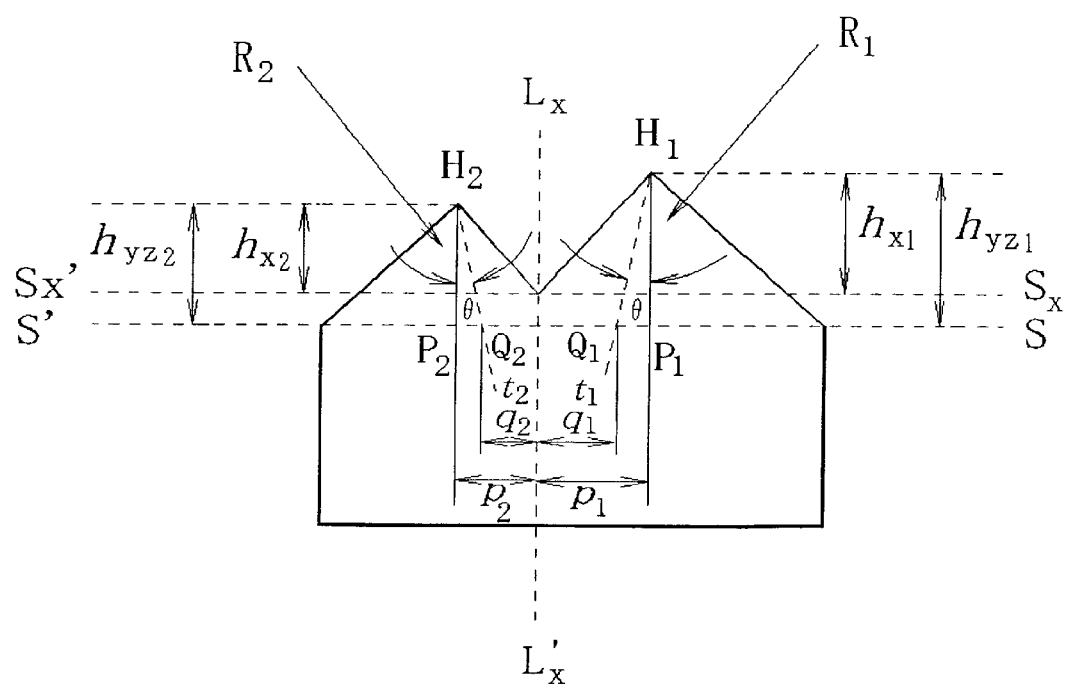
FIG. 15 is a sectional view of the element group in FIG. 14.
Figure 16:
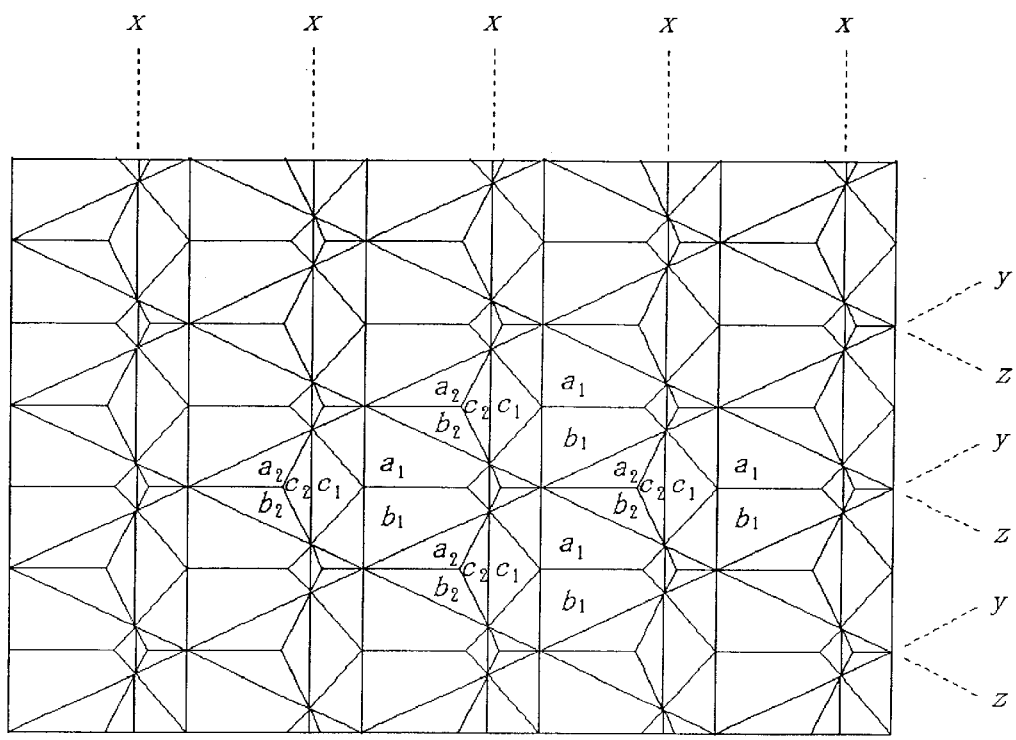
FIG. 16 is a top view of a triangular-pyramidal retroreflective element group of another mode of the present invention having a plus tilt.
Figure 17:
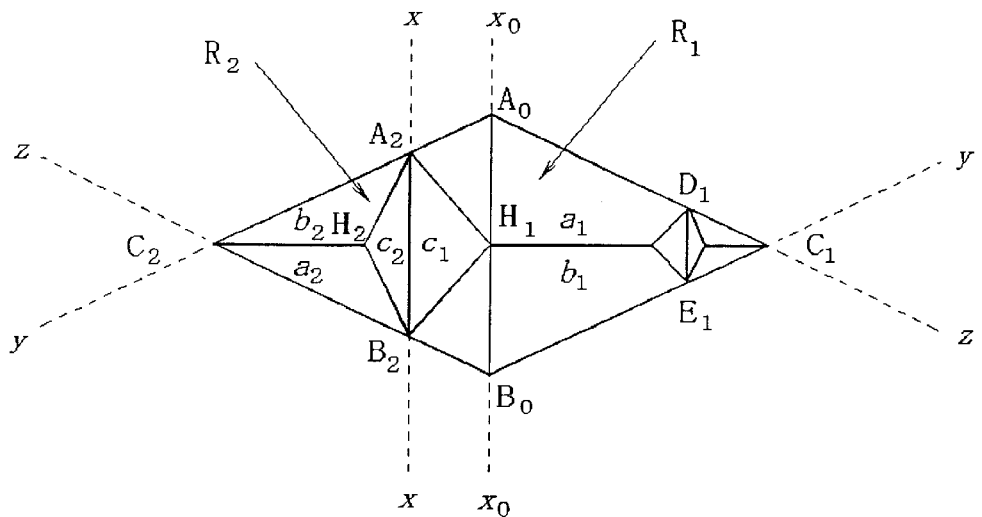
FIG. 17 is a top view of the triangular-pyramidal retroreflective element pair in FIG. 16.
Figure 18:
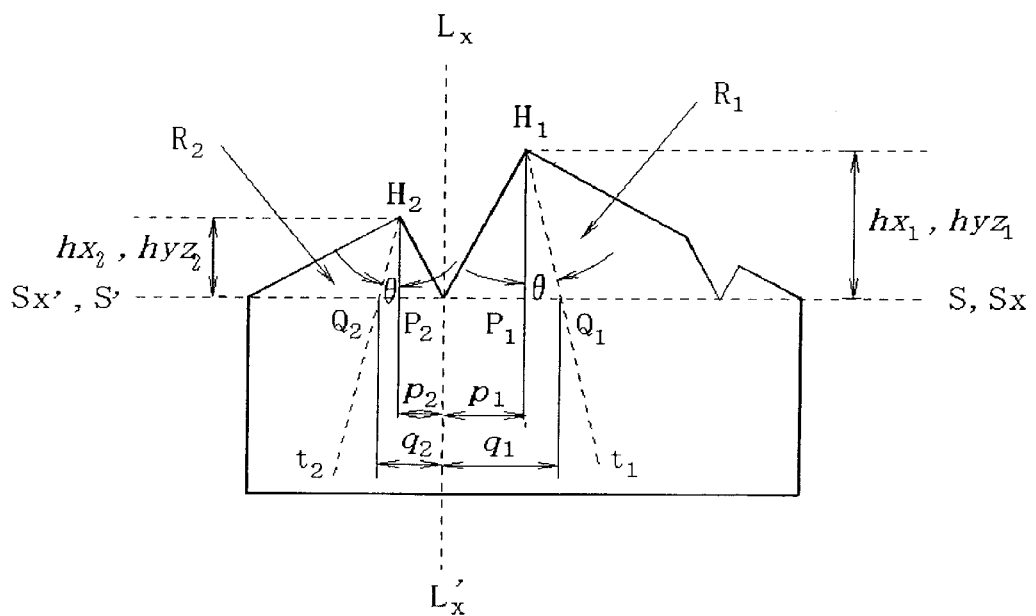
FIG 18 is a sectional view of the element group in FIG. 17.
Figure 19:
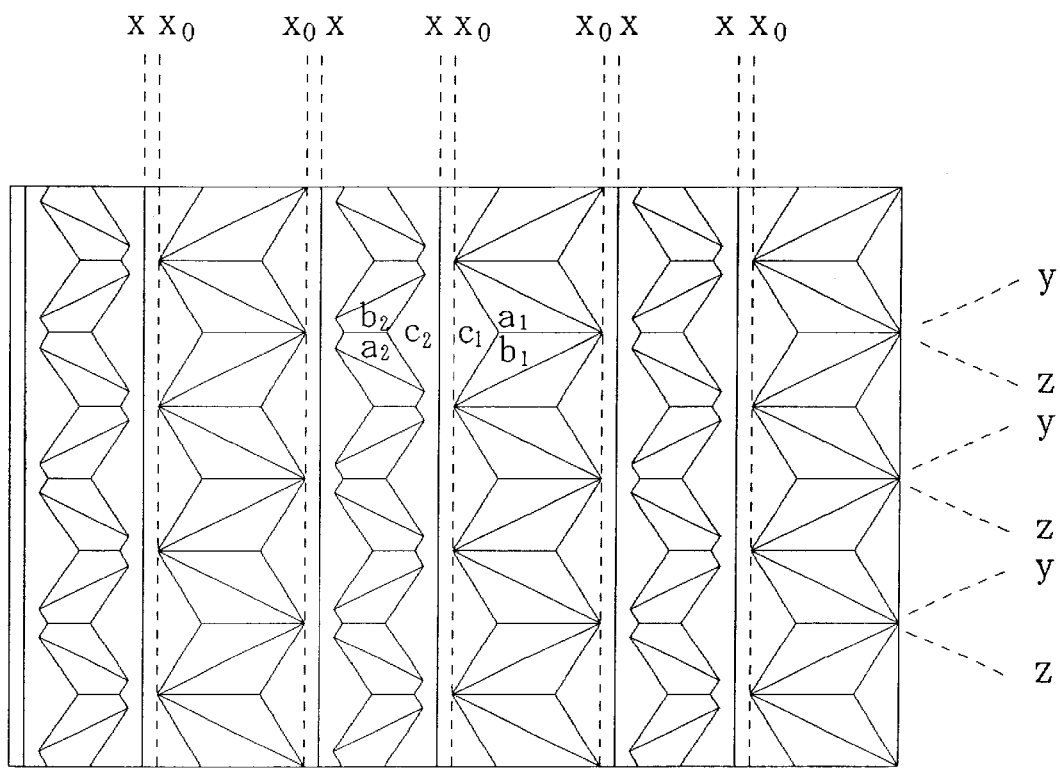
FIG.19 is a top view of a prism assembly face of still another mode of the present invention having a plus tilt.
Figure 20:
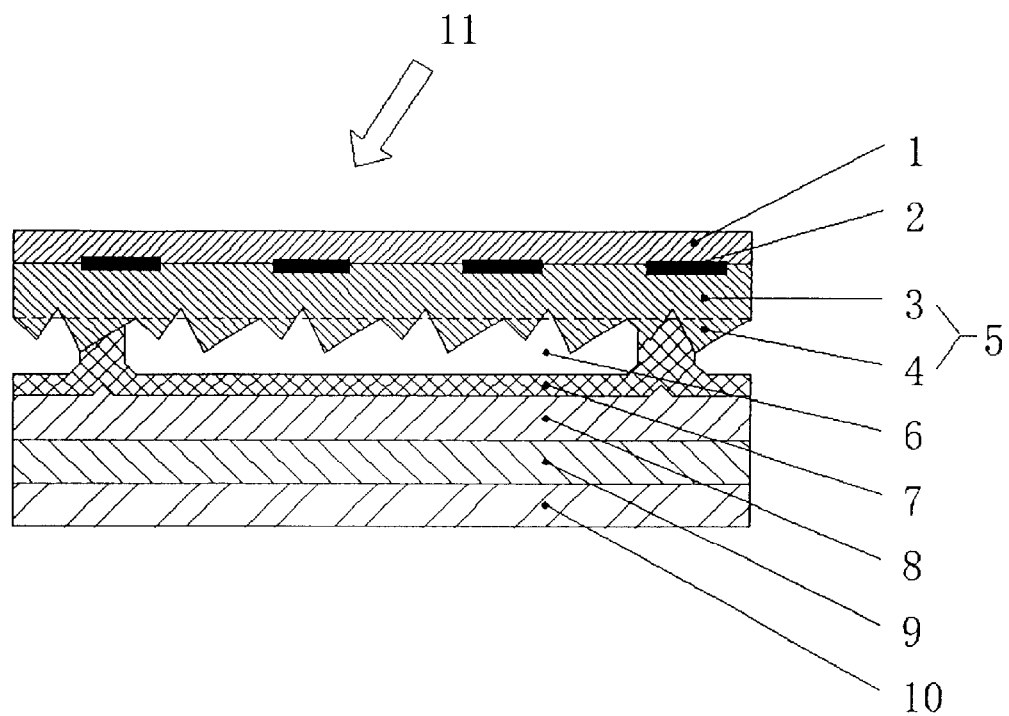
FIG. 20 is a sectional view of a triangular-pyramidal cube-corner retroreflective sheeting of the present invention.
Figure 21:
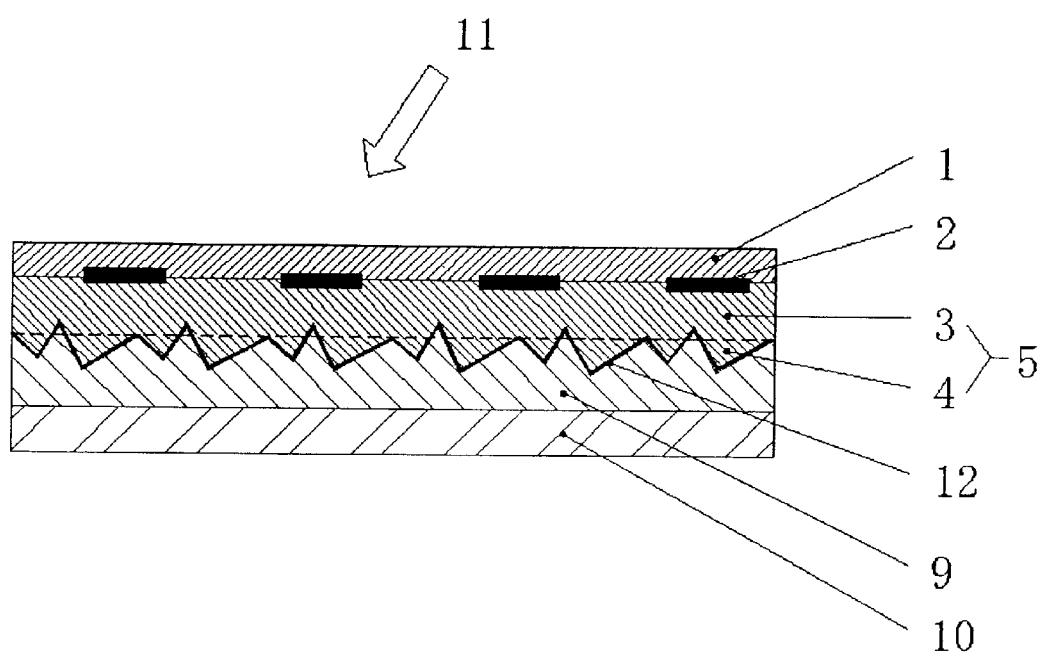
FIG. 21 is a sectional view of another preferred structure of a triangular-pyramidal cube-corner retroreflective sheeting of the present invention.

Many groups of V-shaped parallel grooves whose y- and z-directional sectional forms are symmetric are cut on a 100-mm-square brass plate whose surface is smoothly cut in a repetitive pattern through the fly-cutting method by using a diamond cutting tool having a tip angle of 71.52° so that a repetitive pitch between y- and z-directional V-shaped grooves becomes 210.88 μm, the depth of a V-shape groove becomes 100 μm, and the crossing angle between the y- and z-directional V-shaped grooves becomes 58.76°.

Thereafter, x-directional V-shaped parallel grooves whose x-directional sectional forms are symmetric are cut in a repetitive pattern by using a diamond cutting tool having a tip angle of 68.53° so that the repetitive pitch between y- and z-directional V-shaped grooves becomes 214.92 μm, the depth of a V-shaped groove becomes 115 μm, and an offset value from a line connecting two intersections between y and z-directional grooves in parallel with the line becomes 11 μm to form a matrix in which a plurality of convex triangular-pyramidal cube-corner element groups are arranged in a closest-packed state on a brass plate.

As for a pair of triangular-pyramidal retroreflective elements thus formed, a height ($hx_1$) from an apex ($H_1$) up to a bottom plane (Sx–Sx') is 115 μm, a height ($hx_2$) from an apex ($H_2$) up to the bottom plane (Sx–Sx') is 100 μm, a height ($hyz_1$) from the apex ($H_1$) up to the bottom plane (S–S') is 100 μm, and a height ($hyz_2$) from the apex ($H_2$) up to the bottom plane (S–S') is 85 μm. Moreover, optical-axis, tilt angles (θ) of the triangular-pyramidal retroreflective elements are respectively equal to +1° and prism angles of three lateral faces constituting a reflective element are respectively equal to 90°.

By using the above brass matrix and a nickel-sulfamate solution having a concentration of 55%, an inverted concave cube-corner molding die made of nickel is manufactured through the electroforming method. A polycarbonate-resin sheeting having a thickness of 200 μm ("Iupilon Sheet H3000" made by Mitsubishi Engineering-Plastics Corp.) is compression-molded at a molding temperature of 200° C. and a molding pressure of 50 kg/cm² by using the above molding die and then, cooled up to 30° C. under the pressure, then, taken out to form a polycarbonate-resin triangular-pyramidal cube-corner retroreflective sheeting on which surface a plurality of triangular-pyramidal retroreflective elements are arranged in a closest-packed state.

Embodiment 2

Similarly to the case of the embodiment 1, many groups of V-shaped parallel grooves whose y- and z-directional sectional forms are symmetric are cut in a repetitive pattern through the fly-cutting method so that a repetitive pitch between y- and z-directional V-shaped grooves becomes 164.18 μm, the depth of a V-shaped groove becomes 80 μm, and the crossing angle between the y- and z-directional V-shaped grooves becomes 50.68°.

Thereafter, x-directional V-shaped parallel grooves whose x-directional sectional forms are symmetric are cut in a repetitive pattern by using a diamond cutting tool having a tip angle of 64.66° so that the repetitive pitch between y- and z-directional V-shaped grooves becomes 191.84 μm, the depth of a V-shaped groove becomes 92 μm, and an offset value from a line connecting two intersections between y- and z-directional grooves in parallel with the line becomes 10 μm to form a matrix in which a plurality of convex triangular-pyramidal cube-corner element groups are arranged in a closest-packed state on a brass plate.

As for a pair of triangular-pyramidal retroreflective elements thus formed, a height ($hx_1$) from an apex ($H_1$) up to a bottom plane (Sx–Sx') is 92 μm, a height ($hx_2$) from an apex ($H_2$) up to the bottom plane (Sx–Sx') is 80 μm, a height ($hyz_1$) from the apex ($H_1$) up to the bottom plane (S–S') is 80 μm, and a height ($hyz_2$) from the apex ($H_2$) up to the bottom plane (S–S') is 68 μm. Moreover, optical-axis tilt angles (θ) of the triangular-pyramidal retroreflective elements are respectively equal to +8° and prism angles of three lateral faces constituting a reflective element are respectively equal to 90°.

Moreover, in accordance with the same method as the case of the embodiment 1, a triangular-pyramidal cube-corner retroreflective sheeting made of polycarbonate resin are formed on which many triangular-pyramidal retroreflective elements whose support layer has a thickness of approx. 150 μm are arranged in a closest-packed state.

Embodiment 3

Similarly to the case of the embodiment 1, many groups of V-shaped parallel grooves whose y- and z-directional sectional forms are symmetric are cut in a repetitive pattern through the fly-cutting method so that a repetitive pitch between y- and z-directional V-shaped grooves becomes 218.2 μm, the depth of a V-shaped groove becomes 110 μm, and the crossing angle between the y- and z-directional V-shaped grooves becomes 64.66°.

Thereafter, x-directional V-shaped parallel grooves whose x-directional sectional forms are symmetric are cut in a repetitive pattern by using a diamond cutting tool having a tip angle of 78.53° so that the repetitive pitch between y- and z-directional V-shaped grooves becomes 204.08 μm, the depth of a V-shaped groove becomes 100 μm, and an offset value from a line connecting two intersections between y- and z-directional grooves in parallel with the line becomes 10 μm to form a matrix in which a plurality of convex triangular-pyramidal cube-corner element groups are arranged in a closest-packed state on a brass plate.

As for a pair of triangular-pyramidal retroreflective elements thus formed, a height ($hx_1$) from an apex ($H_1$) up to a bottom plane (Sx–Sx') is 100 μm, a height ($hx_2$) from an apex ($H_2$) up to the bottom plane (Sx–Sx') is 110 μm, a height ($hyz_1$) from the apex ($H_1$) up to the bottom plane (S–S') is 100 μm, and a height ($hyz_2$) from the apex ($H_2$) up to the bottom plane (S–S') is 90 μm. Moreover, optical-axis tilt angles (θ) of the triangular-pyramidal retroreflective elements are respectively equal to −8° and prism angles of three lateral faces constituting a reflective element are respectively equal to 90°.

Moreover, in accordance with the same method as the case of the embodiment 1, a triangular-pyramidal cube-corner retroreflective sheeting made of polycarbonate resin is formed on which many triangular-pyramidal retroreflective elements whose support layer has a thickness of approx. 150 μm are arranged in a closest-packed state.

Comparative Example 1

Similarly to the case of the embodiment 1, many groups of V-shaped parallel grooves whose y- and z-directional sectional forms are symmetric are cut in a repetitive pattern through the fly-cutting method so that a repetitive pitch between y- and z-directional V-shaped grooves becomes 210.88 μm, the depth of a V-shaped groove becomes 100 μm, and the crossing angle between the y- and z-directional V-shaped grooves becomes 58.76°. Thereafter, an x-directional V-shaped parallel groove group having a V-shaped-groove repetitive pitch of 214.92 μm, and a V-shaped-groove depth of 100 μm is cut in a repetitive pattern by using a diamond cutting tool having a tip angle of 68.53° to form a matrix in which many convex triangular-pyramidal cube-corner element groups are arranged in a closest state on a brass plate.

As for a pair of triangular-pyramidal retroreflective elements thus formed, heights ($hx_1$ and $hx_2$) from apexes ($H_1$ and $H_2$) up to a bottom plane (Sx–Sx') are 100 μm and heights ($hyz_1$ and $hyz_2$) from the apexes ($H_1$ and $H_2$) up to the bottom plane (S–S') are also 100 μm. Optical-axis tilt angles (θ) of the triangular-pyramidal retroreflective elements are respectively equal to −1° and prism angles of three lateral faces constituting a reflective element are respectively equal to 90°.

Moreover, in accordance with the same method as the case of the embodiment 1, a triangular-pyramidal cube-corner retroreflective sheeting made of polycarbonate resin is formed on which many triangular-pyramidal retroreflective elements whose support layer has a thickness of approx. 150 μm are arranged in a closest-packed state.

Comparative Example 2

Similarly to the case of the embodiment 1, many groups of V-shaped parallel grooves whose y- and z-directional sectional forms are symmetric are cut in a repetitive pattern through the fly-cutting method so that a repetitive pitch between y- and z-directional V-shaped,grooves becomes 218.28 μm, the depth of a V-shaped groove becomes 100 μm, and the crossing angle between the y- and z-directional V-shaped grooves becomes 64.66°. Thereafter, an x-directional V-shaped parallel groove group having a V-shaped-groove repetitive pitch of 204.08 μm, and a V-shaped-groove depth of 100 μm is cut in a repetitive pattern by using a diamond cutting tool having a tip angle of 78.53° to form a matrix in which many convex triangular-pyramidal cube-corner element groups are arranged in a closest state on a brass plate.

As for a pair of triangular-pyramidal cube-corner retroreflective elements thus formed, heights ($hx_1$ and $hx_2$) from apexes ($H_1$ and $H_2$) up to a bottom plane (Sx–Sx') are 100 μm and heights ($hyz_1$ and $hyz_2$) from the apexes ($H_1$ and $H_2$) up to the bottom plane (S–S') are also 100 μm. Optical-axis tilt angles (θ) of the triangular-pyramidal retroreflective elements are respectively equal to −4° and prism angles of three lateral faces constituting a reflective element are respectively equal to 90°.

Moreover, in accordance with the same method as the case of the embodiment 1, a triangular-pyramidal cube-corner retroreflective sheeting made of polycarbonate resin is formed on which many triangular-pyramidal retroreflective elements whose support layer has a thickness of approx. 150 μm are arranged in a closest-packed state.

First table shows values obtained by measuring coefficients of retroreflection of the triangular-pyramidal cube-corner retroreflective sheetings formed for the above embodiments 1 to 3 and comparative examples 1 and 2 (unit of reflectivity is cd/1x/m$^2$).

The coefficients of retroreflection were measured in accordance with the measuring method specified by Retroreflectors-Optical Properties-Measuring method specified in JIS Z8714-1995 by setting combinations of observation angles and entrance angles to 0.2°/5°, 0.2°/15°, 0.2°/30°, 0.330/50, and 1.0°/5°.

Figure 22:
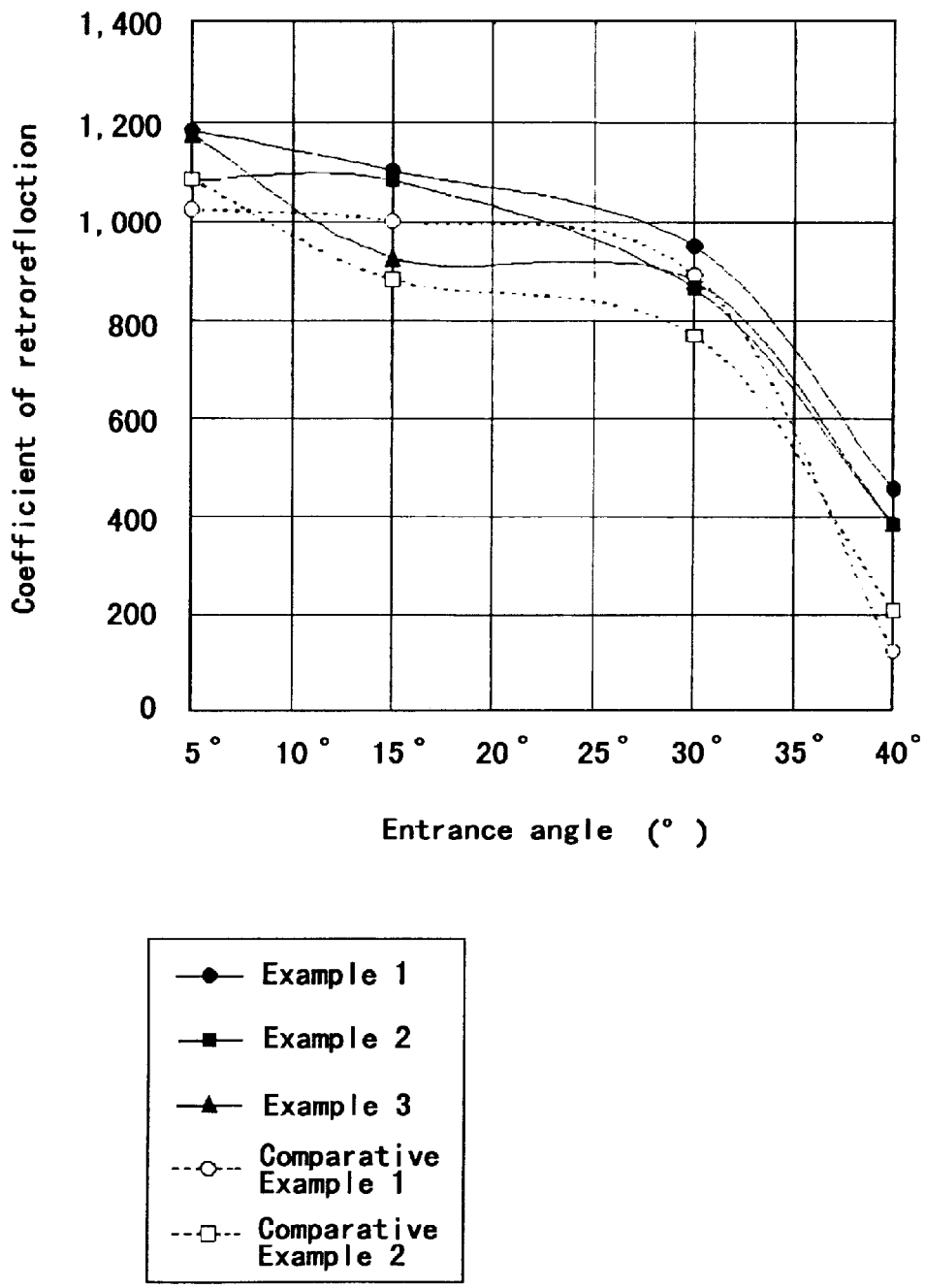
FIG. 22 is a graph showing relations between coefficients of retroreflection and entrance angles of triangular-pyramidal retroreflective sheetings formed for embodiments of the present invention and comparative examples.

To examine entrance angularities of the triangular-pyramidal cube-corner retroreflective sheetings formed for the embodiments 1 to 3 and comparative examples 1 and 2, coefficients of retroreflection of samples were measured by keeping an observation angle at an constant value 0.2° and changing entrance angles to 5°, 15°, 30°, and 40°. FIG. 22 shows the relation between entrance angles and retrorefletction coefficients at the entrance angles by assigning the entrance angle to x-axis and the coefficient of retroreflection at each entrance angle to y-axis.

Figure 23:
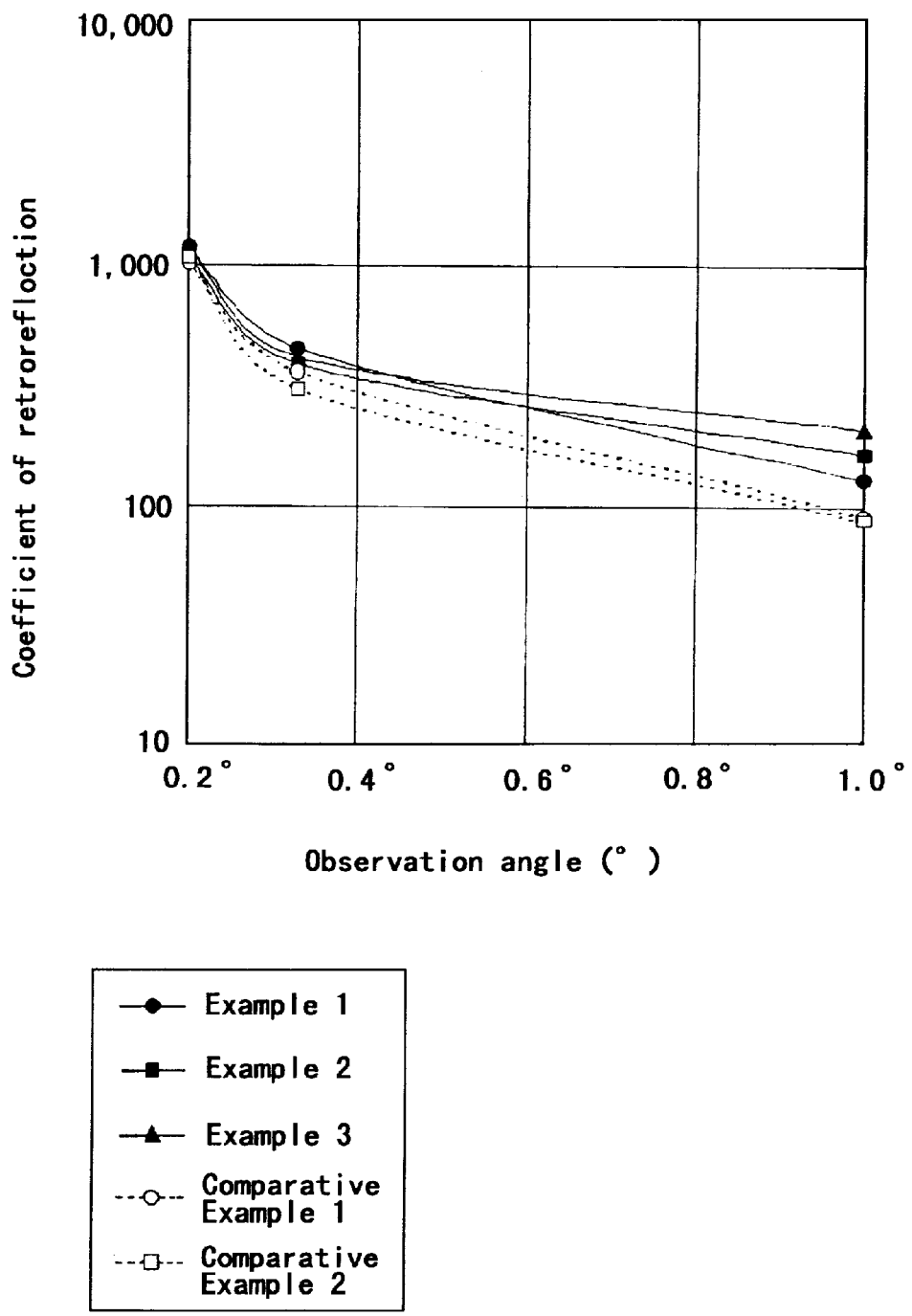
FIG. 23 is a graph showing relations between coefficients or retroreflection and observation angles of triangular-pyramidal retroreflective sheetings formed for embodiments of the present invention and comparative examples.

Moreover, to examine observation angularities of the triangular-pyramidal cube-corner retroreflective sheetings formed for the embodiments 1 to 3 and comparative examples 1 and 2, coefficients of retroreflection of samples were measured by fixing an observation angle to an constant value 5° and changing observation angles to 0.2°, 0.33°, 1.0°. FIG. 23 shows the relation between observation angles and retrorefletction coefficients at the entrance angles by assigning the observation angle to x-axis and the coefficient of retroreflection at each entrance angle to y-axis which is a logarithmic axis.

As shown in First table and FIGS. 22 and 23, as for the triangular-pyramidal cube-corner retroreflective sheetings of the present invention formed for the embodiments 1 to 3, coefficients of retroreflection are remarkably improved at a large entrance angle, particularly at an entrance angle of 40° and moreover, coefficients of retroreflection are remarkably improved at a large observation angle. As for the triangular-pyramidal cube-corner retroreflective sheeting of the prior art formed for the comparative example 1 or 2, brightness is remarkably lowered at an entrance angle of 40° or an observation angle of 1.0°.

TABLE 1

| | | (cd/lx*m²) | | | | |
| --- | --- | --- | --- | --- | --- | --- |
| Observation angle | Entrance angle | Embodiment 1 | Embodiment 2 | Embodiment 3 | Comparative Example 1 | Comparative Example 2 |
| 0.2° | 5° | 1,182 | 1,085 | 1,176 | 1,026 | 1,086 |
| 0.2° | 15° | 1,104 | 1,082 | 927 | 1,003 | 883 |
| 0.2° | 30° | 951 | 864 | 879 | 894 | 771 |
| 0.2° | 40° | 457 | 384 | 387 | 124 | 210 |
| 0.33° | 5° | 453 | 391 | 417 | 364 | 310 |
| 1.0° | 5° | 129 | 167 | 210 | 92 | 88 |

What is claimed is:

1. A triangular-pyramidal cube-corner retroreflective sheeting wherein a pair of triangular-pyramidal cube-corner retroreflective elements partitioned by three lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other are arranged in a closest-packed state so as to protrude to one side on a common bottom plane (S–S'), faced lateral faces (faces $c_1$ and $c_2$) of this pair of triangular-pyramidal retroreflective elements are paired by sharing a base (x), the bottom plane (S–S') is a common plane including bases (z and z) of one-side faces (faces $a_1$ and $a_2$) and the bases (y and y) of the other-side faces (faces $b_1$ and $b_2$) of this pair of triangular-pyramidal retroreflective elements, this pair of triangular-pyramidal retroreflective elements sharing the base (x) have opposite faces (faces $c_1$ and $c_2$) with shapes different from each other, and heights from the bottom plane (S–S') up to apexes of the elements are different from each other.

2. The triangular-pyramidal cube-corner retroreflective sheeting according to claim 1, wherein a pair of triangular-pyramidal cube-corner retroreflective elements partitioned by three lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other have substantially optically analogous shapes and thereby, this pair of triangular-pyramidal cube-corner retroreflective elements have angles (θ) formed between substantially same optical axes though different from each other in direction by 180° and a vertical line.

3. The triangular-pyramidal cube-corner retroreflective sheeting according to claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is substantially equal to $hyz_1$.

4. The triangular-pyramidal cube-corner retroreflective sheeting according to claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$ ) of the two triangular-pyramidal retroreflective elements up to the apex ($H_1$) is $hyz_1$, a triangular-pyramidal retroreflective element is included in which $hx_1$ is substantially different from $hyz_1$.

5. The triangular-pyramidal cube-corner retroreflective sheeting according to any one of claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$)of the two triangular-pyramidal retroreflective elements up to the apex ($H_1$) is $hyz_1$, a triangular-pyramidal retroreflective element is included in which $hx_1$ is substantially larger than $hyz_1$.

6. The triangular-pyramidal cube-corner retroreflective sheeting according to any one of claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is larger than $hyz_1$ so that $hx_1/hyz_1$ is kept in a range of 1.05 to 1.5.

7. The triangular-pyramidal cube-corner retroreflective sheeting according to any one of claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is larger than $hyz_1$ so that $hx_1/hyz_1$ is kept in a range of 1.07 to 1.4.

8. The triangular-pyramidal cube-corner retroreflective sheeting according to claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is substantially smaller than $hyz_1$.

9. The triangular-pyramidal cube-corner retroreflective sheeting according to any one of claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is smaller than $hyz_1$ so that $hx_1/hyz_1$ is kept in a range of 0.67 to 0.95.

10. The triangular-pyramidal cube-corner retroreflective sheeting according to any one of claim 1 or 2, wherein, when it is assumed that a height from a bottom plane (Sx–Sx') including bases (x,x, . . . ) shared by opposite faces (faces $c_1$ and $c_2$) of each pair of triangular-pyramidal retroreflective elements up to an apex ($H_1$) of the elements is $hx_1$ and a height from a common bottom plane (S–S') including bases (z and z) of one-side lateral faces (faces $a_1$ and $a_2$) and bases (y and y) of the other-side lateral faces (faces $b_1$ and $b_2$) of the two triangular-pyramidal retroreflective elements up to the apex ($H_1$) is $hyz_1$, a triangular-pyramidal retroreflective element is included in which $hx_1$ is smaller than $hyz_1$ so that $hx_1/hyz_1$ is kept in a range of 0.71 to 0.93.

11. The triangular-pyramidal cube-corner retroreflective sheeting according to any one of claim 1 or 2, wherein, when it is assumed that faced lateral faces (faces $c_1$ and $c_2$) of a pair of triangular-pyramidal retroreflective elements are paired by sharing a base (x), a height from a common bottom plane (S–S') including bases (z and z) of one-side lateral faces (faces $a_1$ and $a_2$) and bases (y and y) of the other-side lateral faces (faces $b_1$ and $b_2$) of this pair of triangular-pyramidal retroreflective elements up to an apex ($H_1$) of one triangular-pyramidal retroreflective element is $hyz_1$, and a height from the bottom plane (S–S') up to an apex ($H_2$) of the other triangular-pyramidal retroreflective element is $hyz_2$, $hyz_1/hyz_2$ ranges between 1.05 and 2.0 (both included).

12. The triangular-pyramidal cube-corner retroreflective sheeting according to claim 11, wherein $hyz_1/hyz_2$ ranges between 1.07 and 1.8 (both included).

13. The triangular-pyramidal cube-corner retroreflective sheeting according to any one of claim 1 or 2, wherein a pair of triangular-pyramidal cube-corner retroreflective elements partitioned by three lateral faces (faces $a_1$, $b_1$, and $c_1$; faces $a_2$, $b_2$, and $c_2$; . . . ) almost perpendicularly intersecting each other because V-shaped grooves having substantially-symmetric cross sections intersect each other are included in which this pair of triangular-pyramidal cube-corner retroreflective elements have substantially optically analogous shapes and thereby, have angles (θ) formed between substantially same optical axes though different from each other in direction by 180° and a vertical line and moreover, an optical axis ($t_1$) of the elements tilts in a direction in which the difference ($q_1$–$p_1$) between the distance ($q_1$) from the intersection ($Q_1$) of the optical axis ($t_1$) and the common bottom plane (S–S') up to a plane (Lx–Lx') including a base (x) shared by this pair of elements and vertical to the common bottom plane (S–S') and the distance ($p_1$) from the intersection ($P_1$) of a vertical line extended from an apex ($H_1$) of the elements to the common bottom plane (S–S') and the vertical plane (Lx–Lx') up to the vertical plane (Lx–Lx') becomes plus (+) or minus (–) so that an angle (θ) formed between the optical axis ($t_1$) and the vertical line becomes 0.5 to 12°.

14. The triangular-pyramidal cube-corner retroreflective sheeting according to any one of claim 1 or 2, wherein the triangular-pyramidal cube-corner reflective elements are included in which an angle (θ) formed between the optical axis ($t_1$) and a vertical line passing through apexes ($H_1$ and $H_2$) of the elements tilts in a plus (+) direction or minus (–) direction so that the angle (θ) ranges between 0.6 and 10° (both included).

* * * * *